United States Patent
Ohhira et al.

(10) Patent No.: US 10,321,516 B2
(45) Date of Patent: Jun. 11, 2019

(54) COMMUNICATION DEVICE, SYSTEM, AND COMPUTER PROGRAM PRODUCT

(71) Applicants: Kohki Ohhira, Tokyo (JP); Masaru Kuroda, Tokyo (JP); Shintaro Kawamura, Kanagawa (JP); Ryusuke Mayuzumi, Kanagawa (JP); Hiroki Sugino, Kanagawa (JP)

(72) Inventors: Kohki Ohhira, Tokyo (JP); Masaru Kuroda, Tokyo (JP); Shintaro Kawamura, Kanagawa (JP); Ryusuke Mayuzumi, Kanagawa (JP); Hiroki Sugino, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/554,500

(22) PCT Filed: Feb. 26, 2016

(86) PCT No.: PCT/JP2016/001065
§ 371 (c)(1),
(2) Date: Aug. 30, 2017

(87) PCT Pub. No.: WO2016/139920
PCT Pub. Date: Sep. 9, 2016

(65) Prior Publication Data
US 2018/0070407 A1 Mar. 8, 2018

(30) Foreign Application Priority Data

Mar. 3, 2015 (JP) .................................. 2015-041319
Oct. 9, 2015 (JP) .................................. 2015-201247

(51) Int. Cl.
*H04W 4/80* (2018.01)
*H04W 8/00* (2009.01)
(Continued)

(52) U.S. Cl.
CPC ............. *H04W 88/06* (2013.01); *H04L 63/18* (2013.01); *H04M 1/7253* (2013.01); *H04W 4/80* (2018.02);
(Continued)

(58) Field of Classification Search
None
See application file for complete search history.

(56) References Cited

U.S. PATENT DOCUMENTS 8,818,276 B2 8/2014 Kiukkonen et al.
2002/0016153 A1 2/2002 Sato et al.
(Continued)

FOREIGN PATENT DOCUMENTS

EP 2 566 290 A1 3/2013
JP 2004-336538 11/2004
(Continued)

OTHER PUBLICATIONS

Extended European Search Report dated Feb. 21, 2018 in European Patent Application No. 16756619.7, citing documents AA, AB, AO, AX and AY therein, 9 pages.

(Continued)

*Primary Examiner* — Jianxun Yang
(74) *Attorney, Agent, or Firm* — Oblon, McClelland, Maier & Neustadt, L.L.P.

(57) ABSTRACT

A communication device includes: a first communication unit that performs communication with another communication device using a first communication scheme that enables communication in a first range. The first communication unit performs, when having determined that the other communication device received transmitted certain information, communication with the other communication device in a second range that is different from the first range and in which the other communication device is capable of receiv-
(Continued)

ing the certain information. The communication device relays communication from the other communication device to another device disposed outside the second range.

10 Claims, 17 Drawing Sheets

(51) Int. Cl.
| | | |
|---|---|---|
| *H04L 29/06* | (2006.01) | |
| *H04M 1/725* | (2006.01) | |
| *H04W 12/06* | (2009.01) | |
| *H04W 12/08* | (2009.01) | |
| *H04W 76/10* | (2018.01) | |
| *H04W 84/10* | (2009.01) | |
| *H04W 84/12* | (2009.01) | |
| *H04W 84/18* | (2009.01) | |
| *H04W 88/04* | (2009.01) | |
| *H04W 88/06* | (2009.01) | |

(52) U.S. Cl.
CPC ........... *H04W 8/005* (2013.01); *H04W 12/06* (2013.01); *H04W 12/08* (2013.01); *H04W 76/10* (2018.02); *H04W 84/10* (2013.01); *H04W 84/12* (2013.01); *H04W 84/18* (2013.01); *H04W 88/04* (2013.01)

(56) References Cited

U.S. PATENT DOCUMENTS

| | | | |
|---|---|---|---|
| 2003/0231611 A1 | 12/2003 | Nakao et al. | |
| 2004/0015575 A1 | 1/2004 | Motoyama | |
| 2010/0015919 A1* | 1/2010 | Tian .................... | H04W 12/06 455/41.2 |
| 2010/0121952 A1 | 5/2010 | Hara | |
| 2010/0322145 A1* | 12/2010 | Yu ......................... | H04B 7/155 370/315 |
| 2011/0117844 A1 | 5/2011 | Fujita | |
| 2011/0275316 A1* | 11/2011 | Suumaki ............ | G06K 7/10237 455/41.1 |
| 2013/0138797 A1 | 5/2013 | Locker et al. | |
| 2014/0342670 A1 | 11/2014 | Kang et al. | |
| 2015/0135260 A1* | 5/2015 | Ilyadis .................... | H04L 63/20 726/1 |

FOREIGN PATENT DOCUMENTS

| | | |
|---|---|---|
| JP | 3669293 | 4/2005 |
| JP | 2009-124409 | 6/2009 |
| JP | 4718748 | 4/2011 |
| JP | 5225033 | 3/2013 |
| JP | 2013-219740 | 10/2013 |
| JP | 2013-236316 | 11/2013 |
| JP | 2013-247614 | 12/2013 |
| JP | 5524583 | 4/2014 |
| JP | 2014-179884 | 9/2014 |
| JP | 2016-082576 | 5/2016 |
| JP | 2016-167795 | 9/2016 |

OTHER PUBLICATIONS

Anonymous, "Terrestrial Trunked Radio (TETRA); Voice Plus Date (V+D); Designers' guide Part 3: Direct Mode Operation (DMO)", ETSI Technical Report ETR 300-3, Retrieved from the internet: http://www.etsi.org/deliver/etsi_etr/300_399/30003/01_60/etr_30003e01p.pdf , XP 55450740, Feb. 2000, pp. 1-72.
Gil Reiter, "A Primer to Wi-Fi provisioning for IoT Applications", Retrieved from the internet: http://www.ti.com/lit/wp/swry011/swry011.pdf , XP 055438785, Jul. 1, 2014, pp. 1-9.
International Search Report and Written Opinion dated May 24, 2016 in PCT/JP2016/001065, filed on Feb. 26, 2016.

* cited by examiner

[Fig. 1]
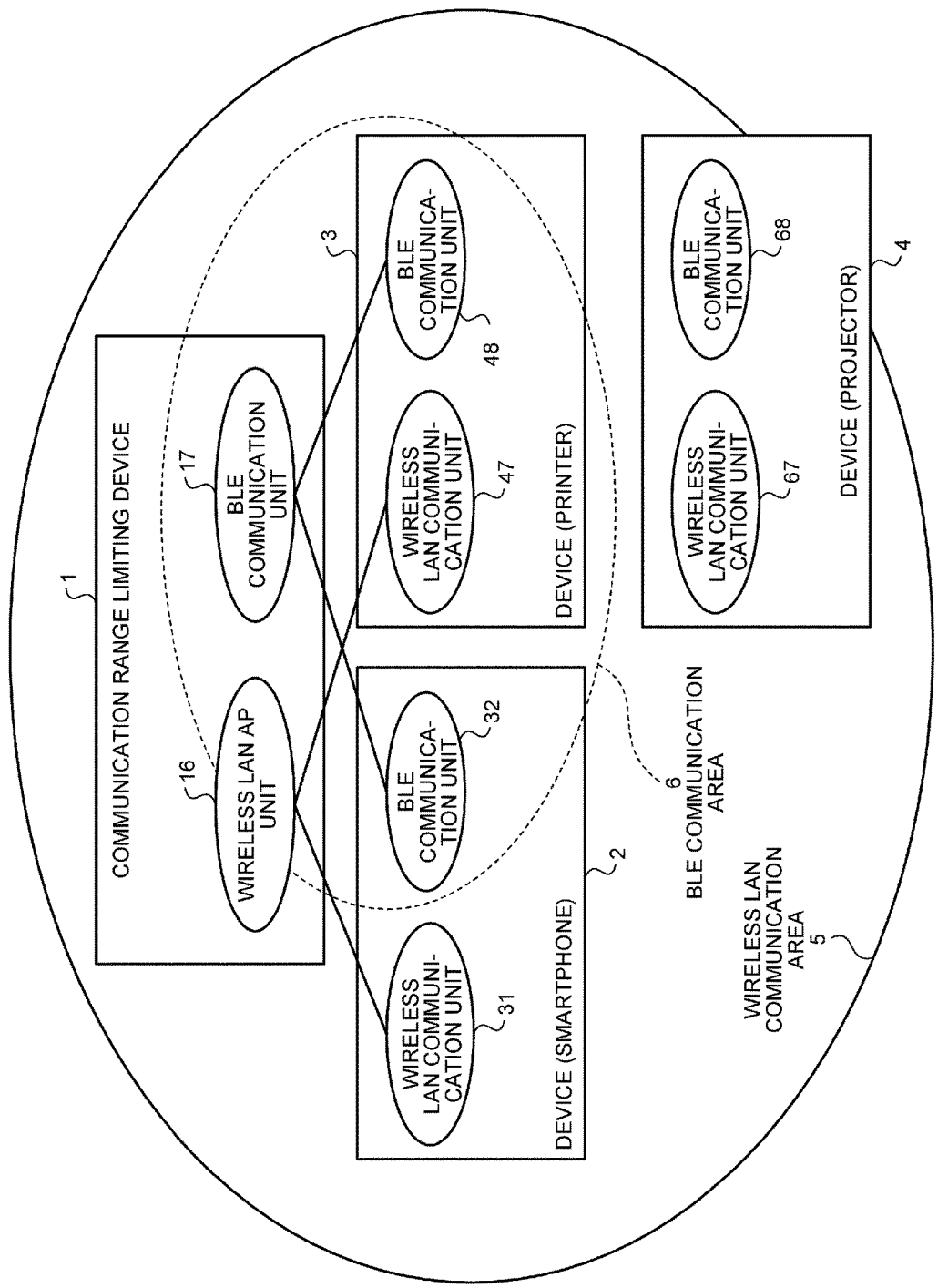

[Fig. 2]
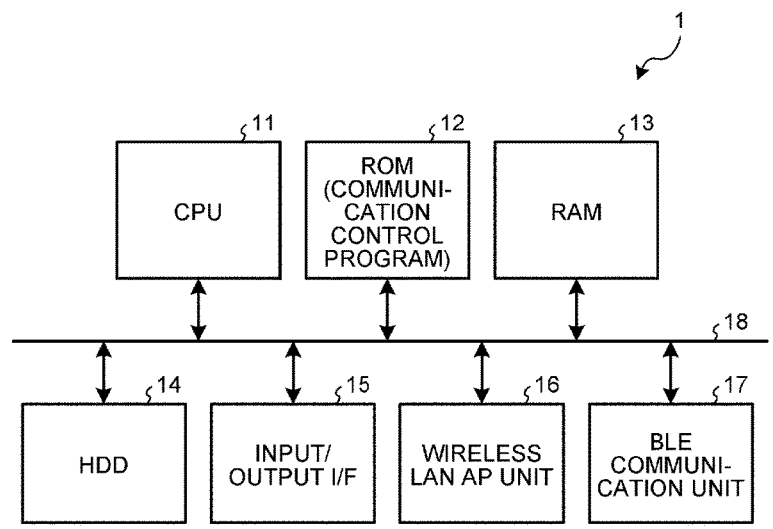
[Fig. 3]
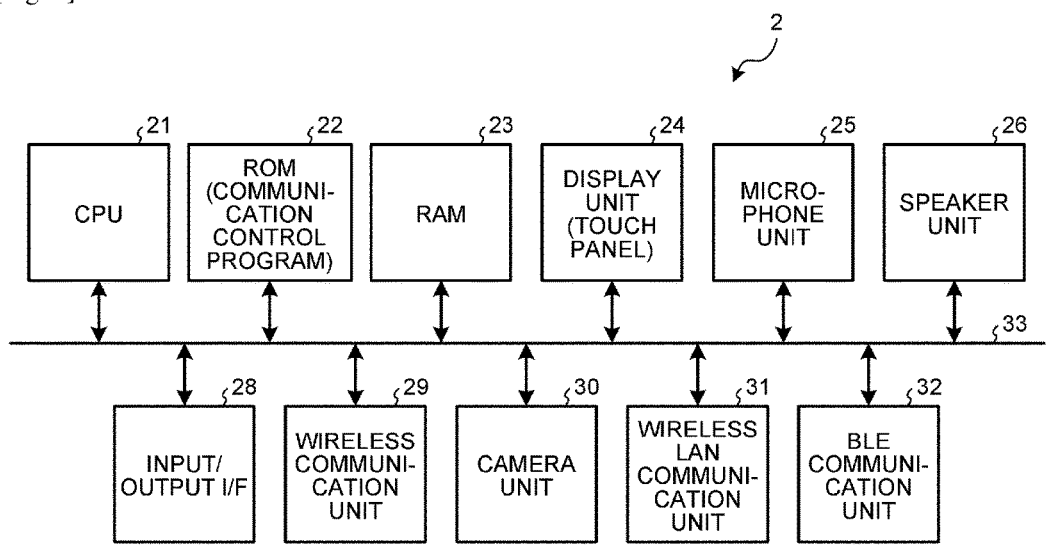

[Fig. 4]
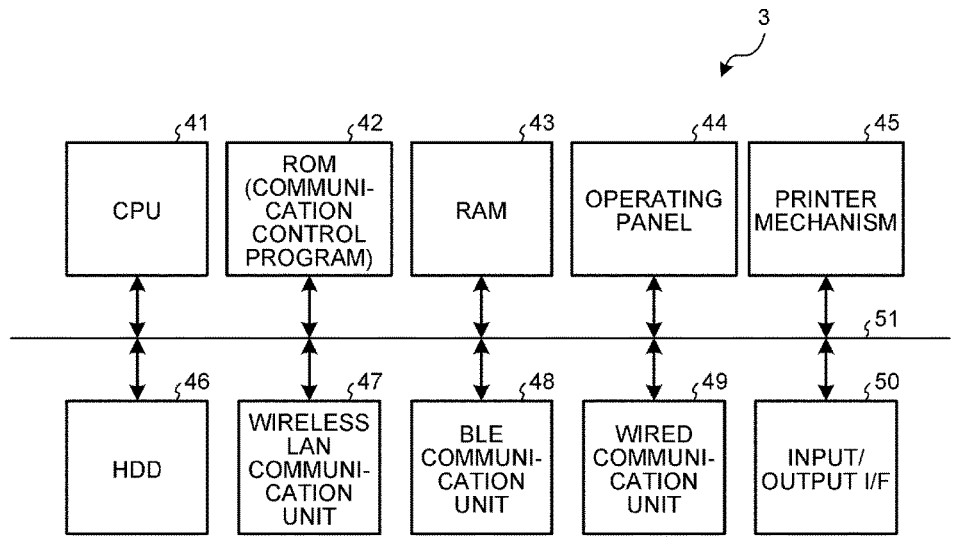
[Fig. 5]
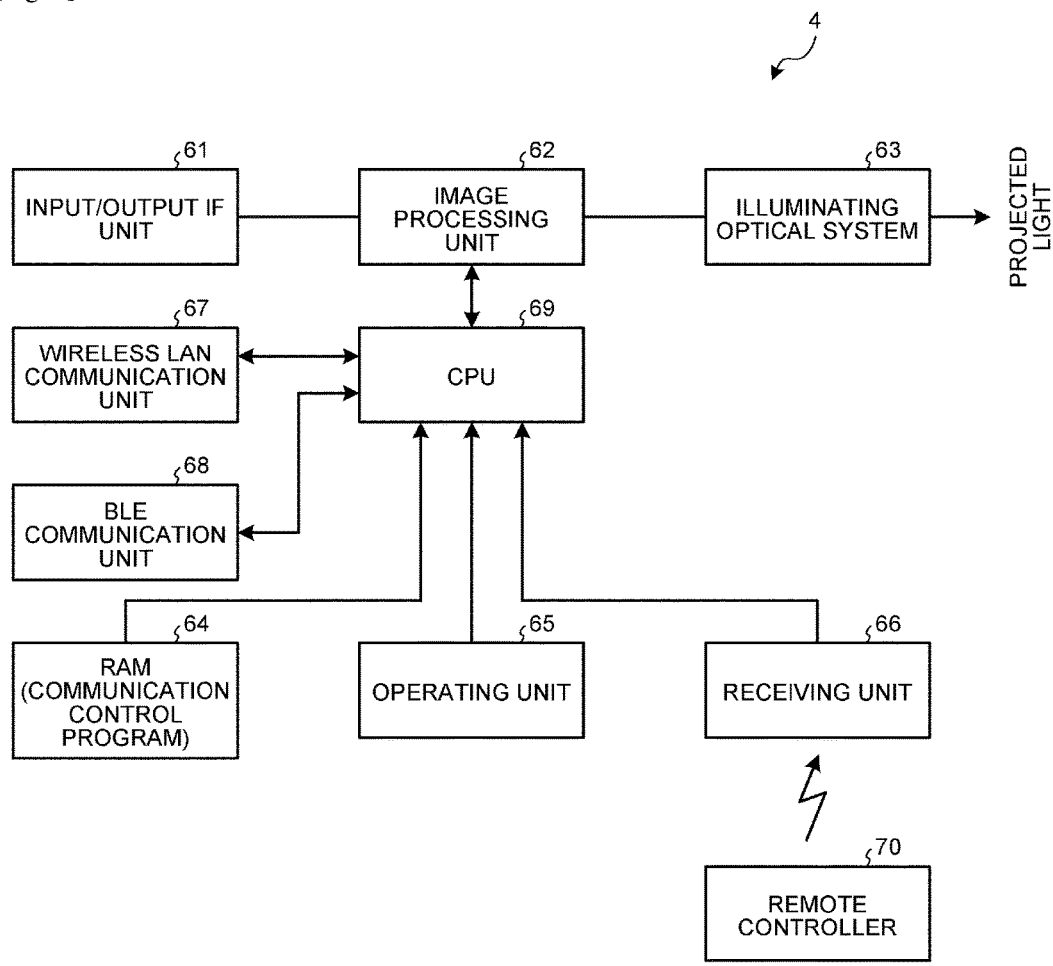

[Fig. 6]
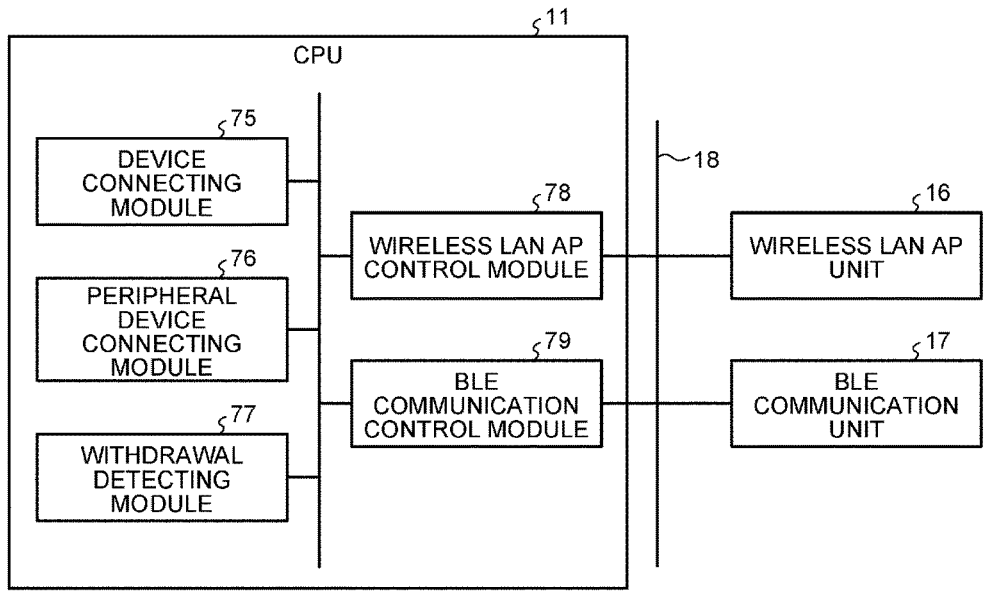
[Fig. 7]
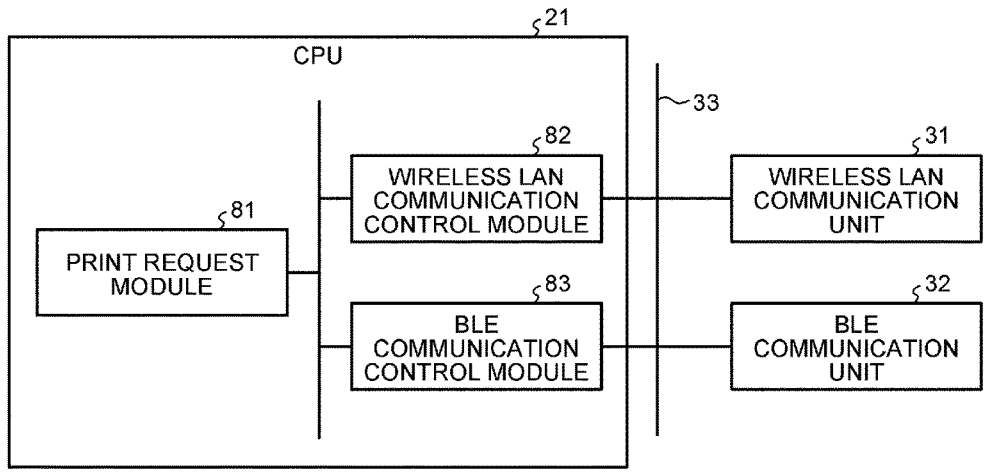
[Fig. 8]
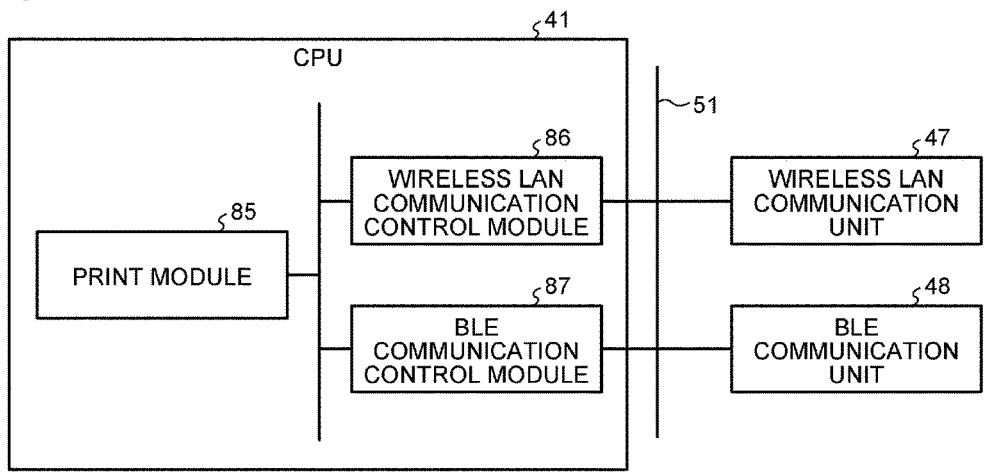

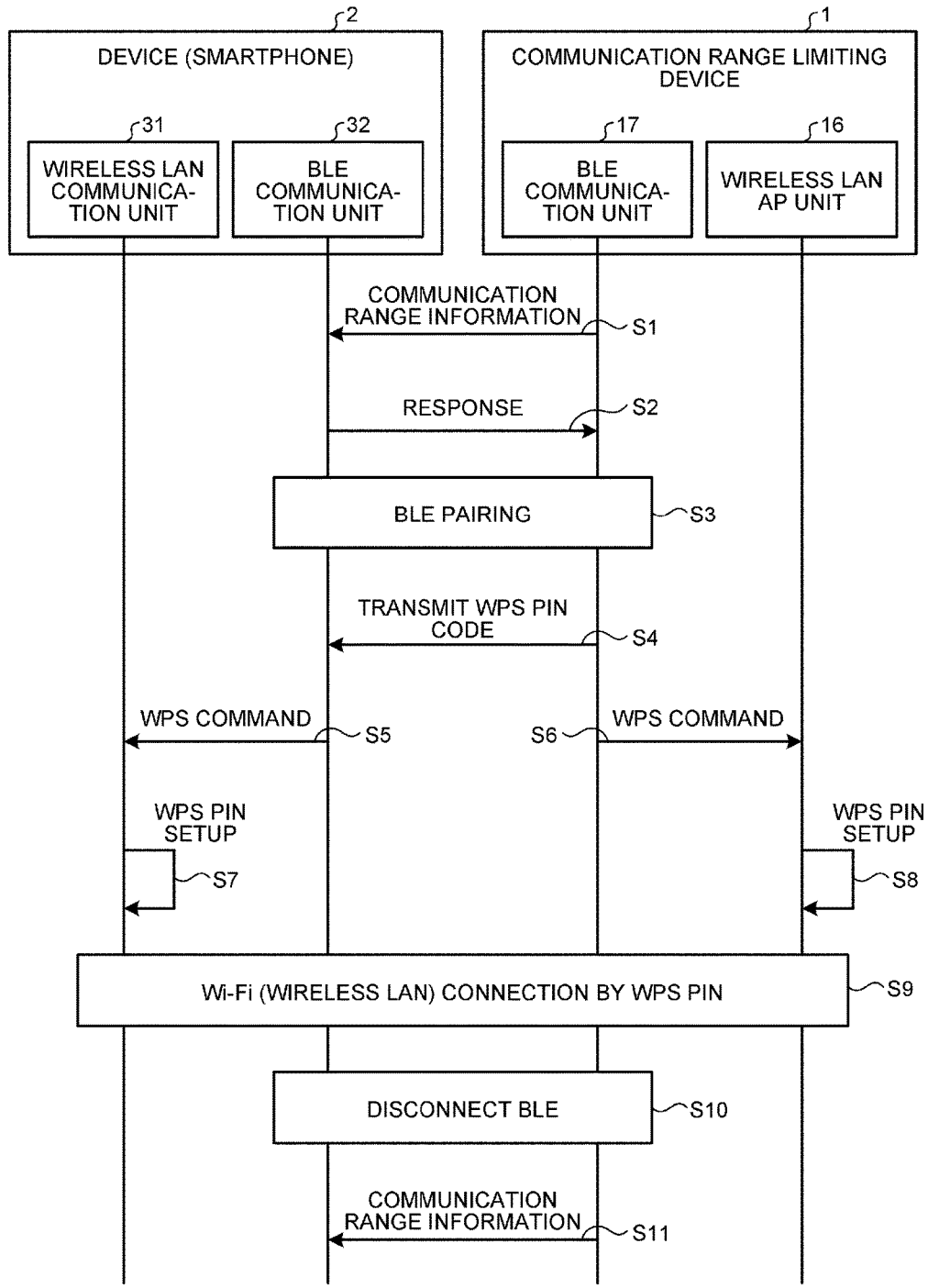

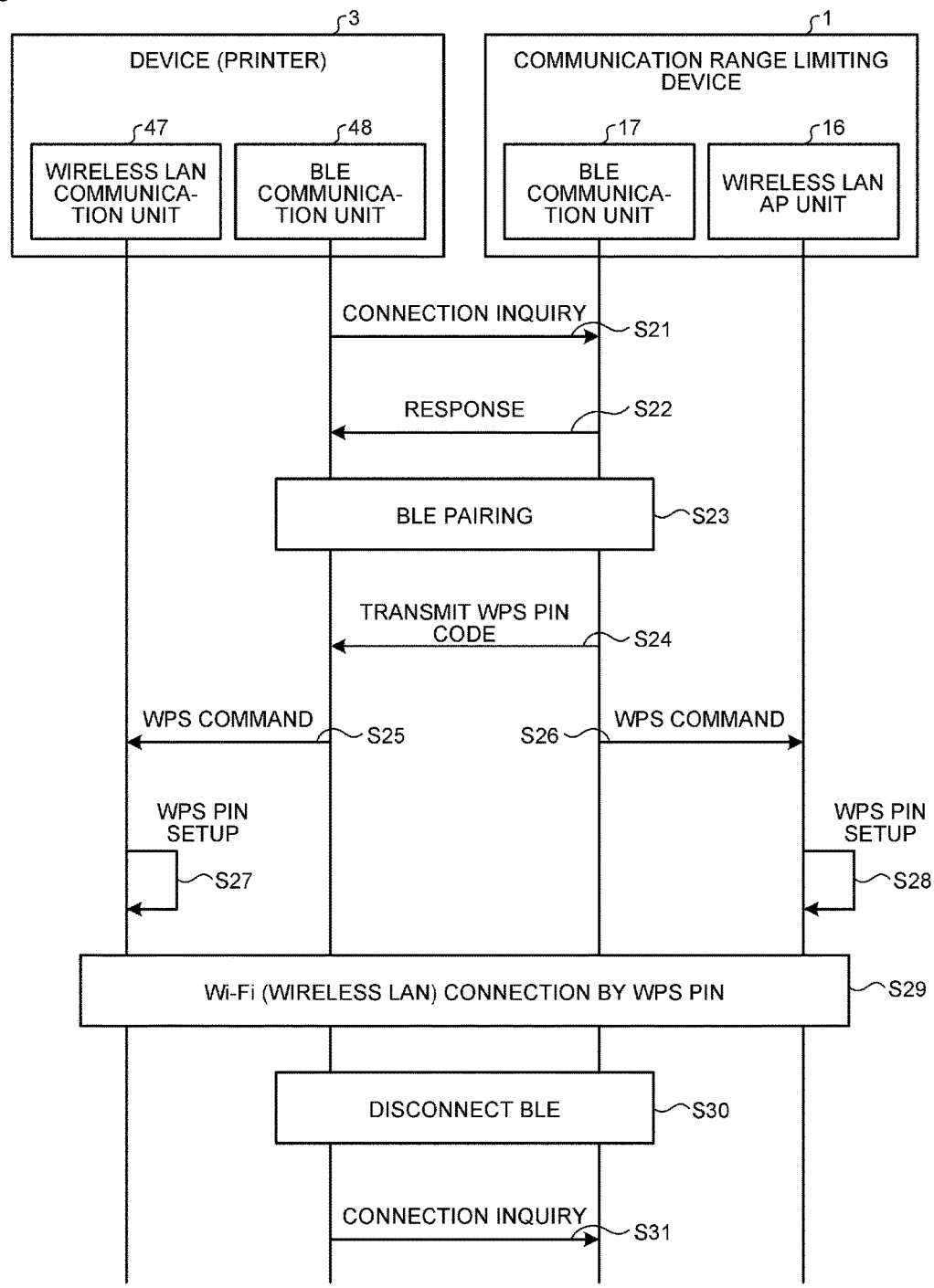

[Fig. 11]
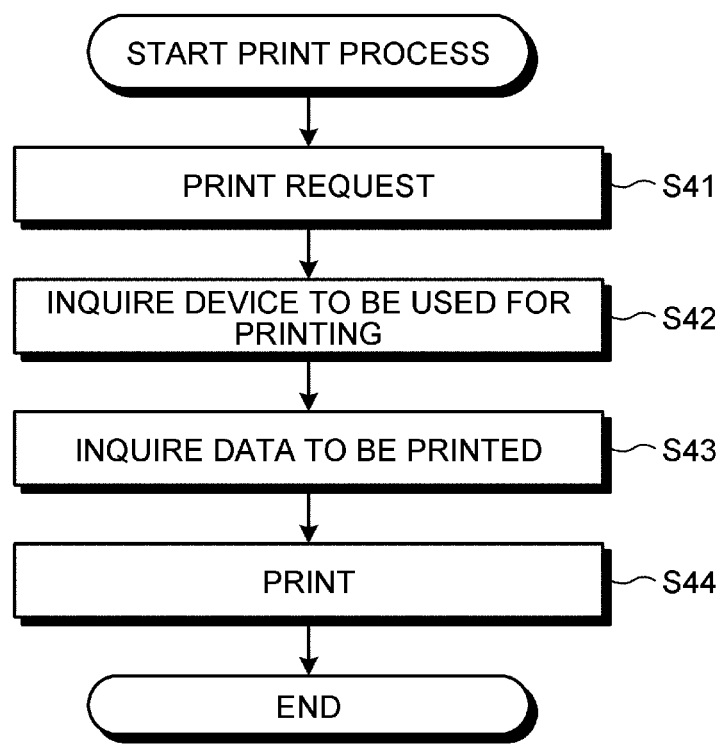

[Fig. 12]
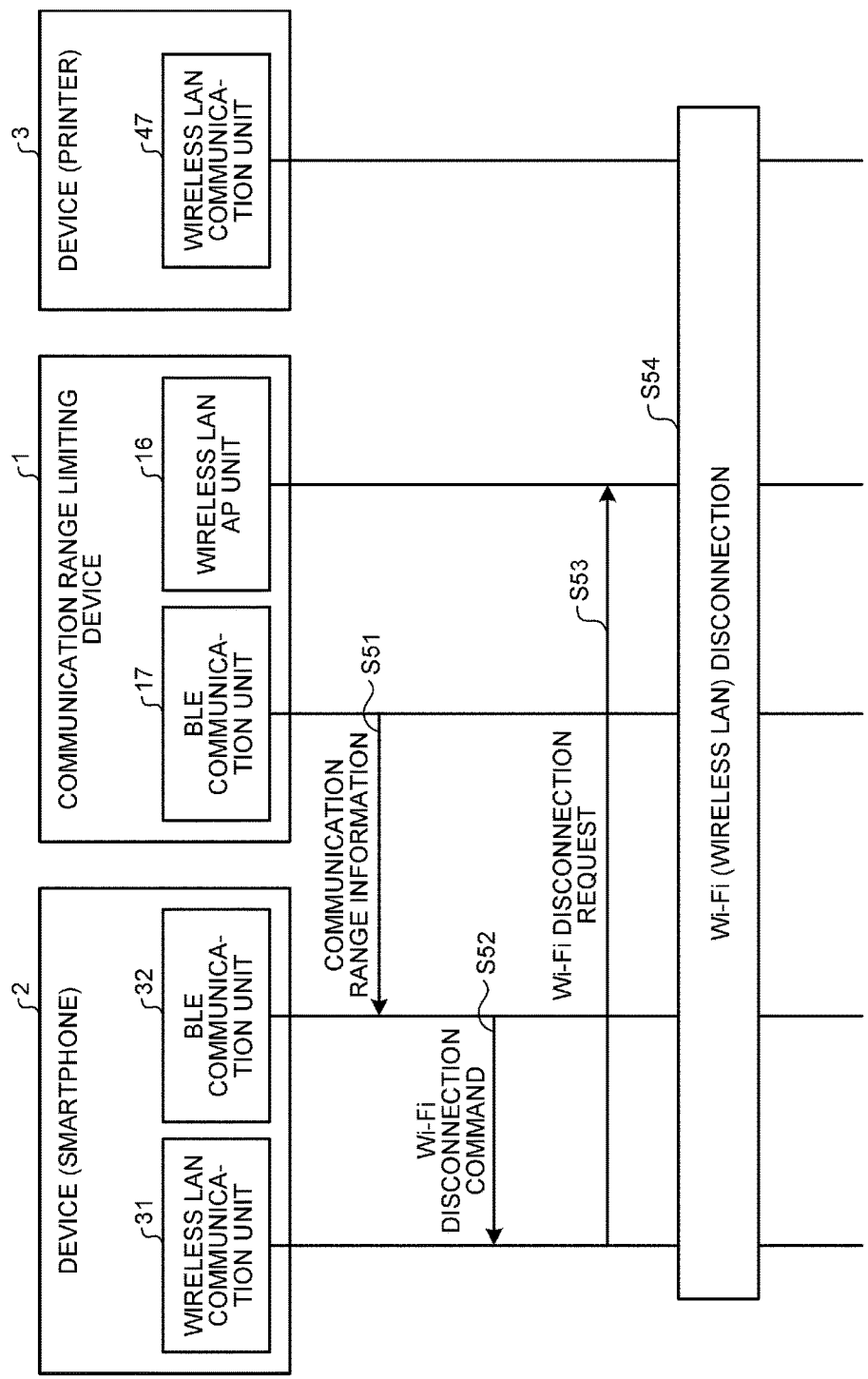

[Fig. 13]
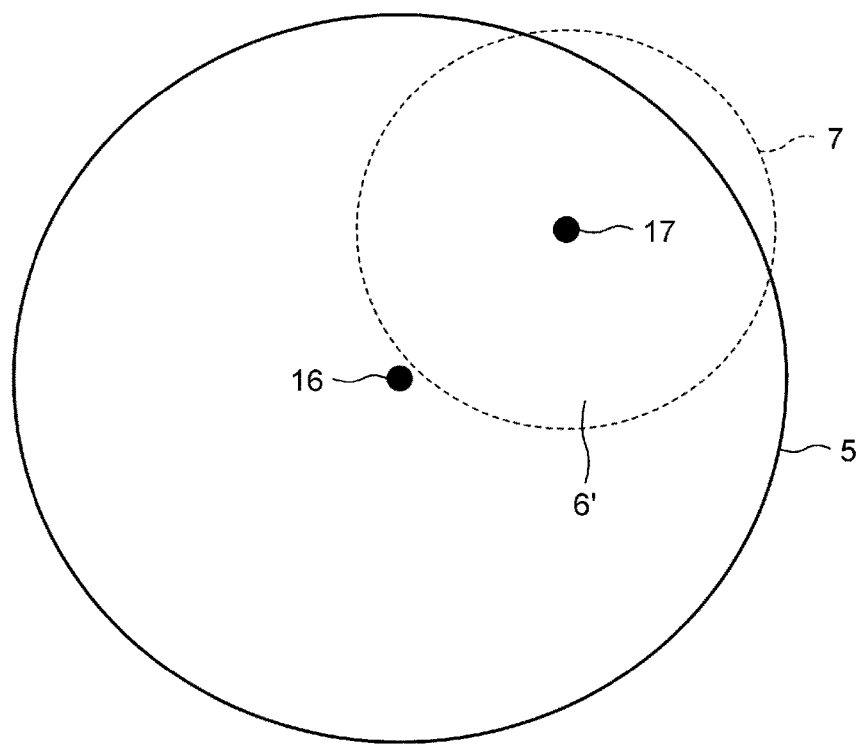

[Fig. 14]
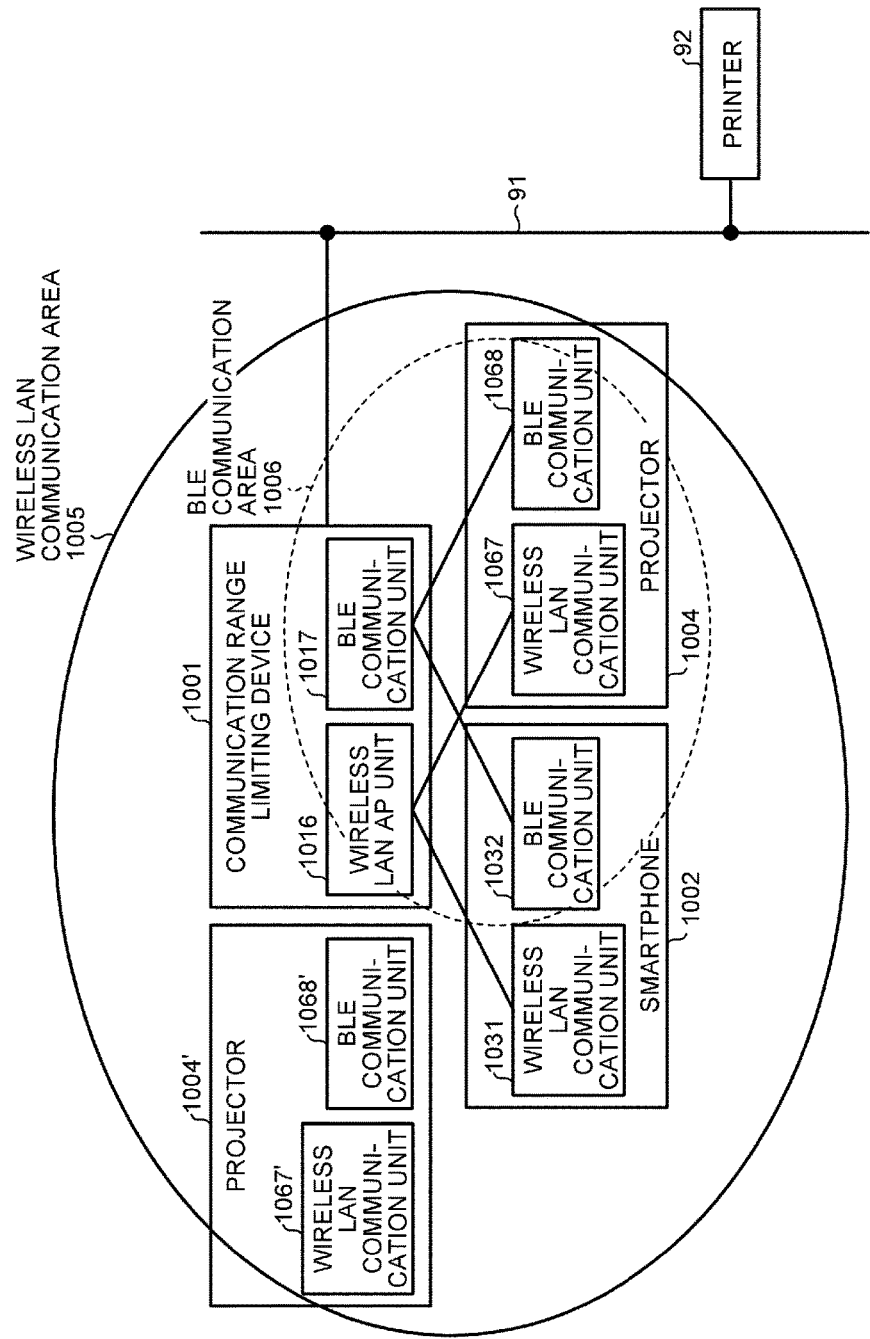

[Fig. 15]
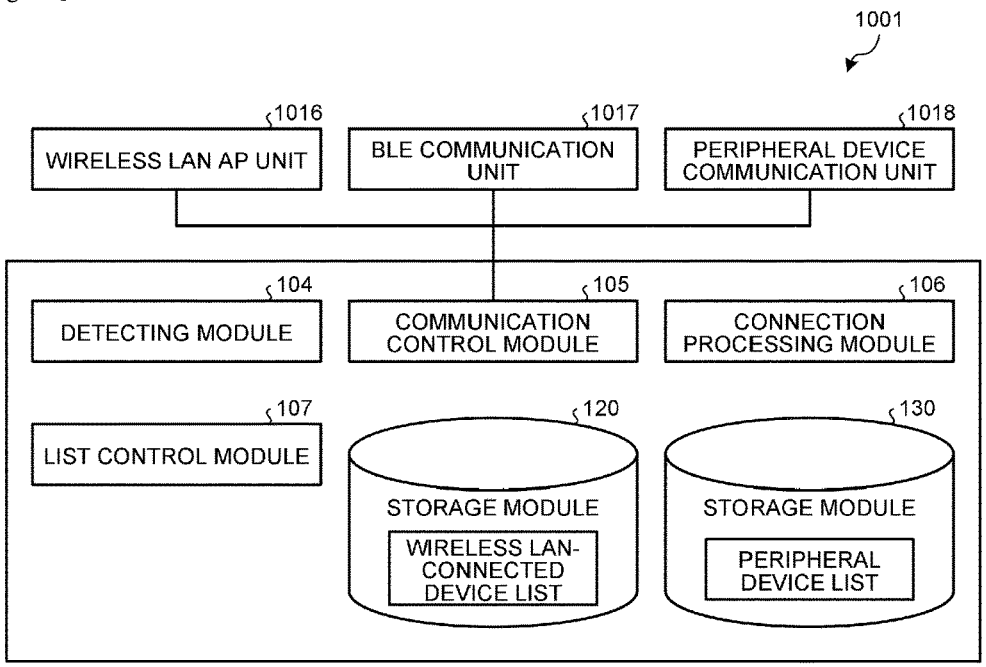
[Fig. 16]
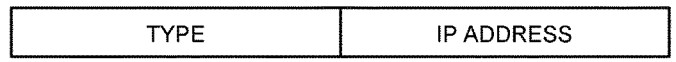
[Fig. 17]
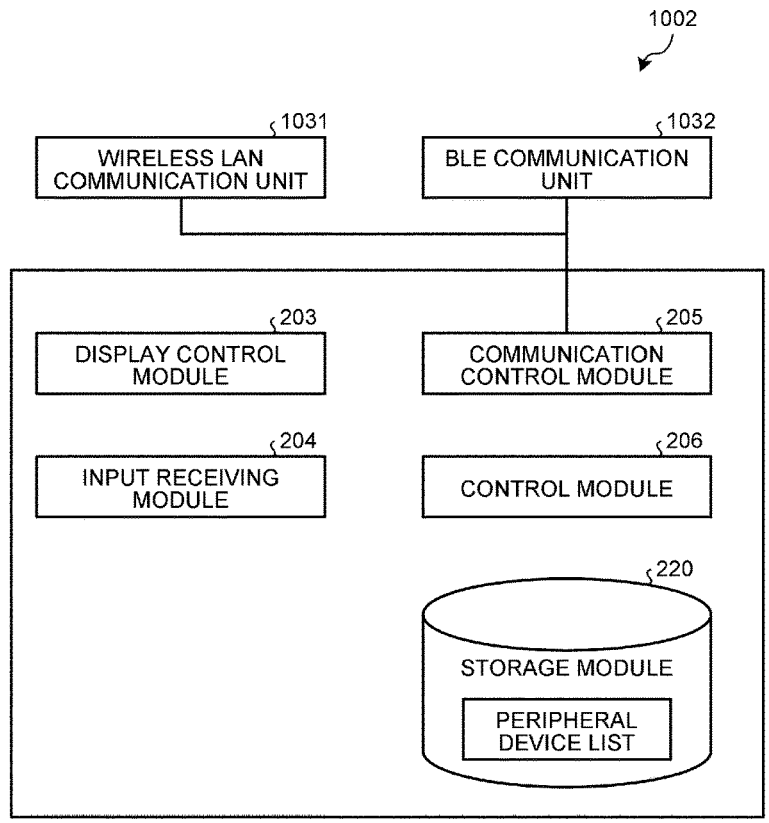

[Fig. 18]
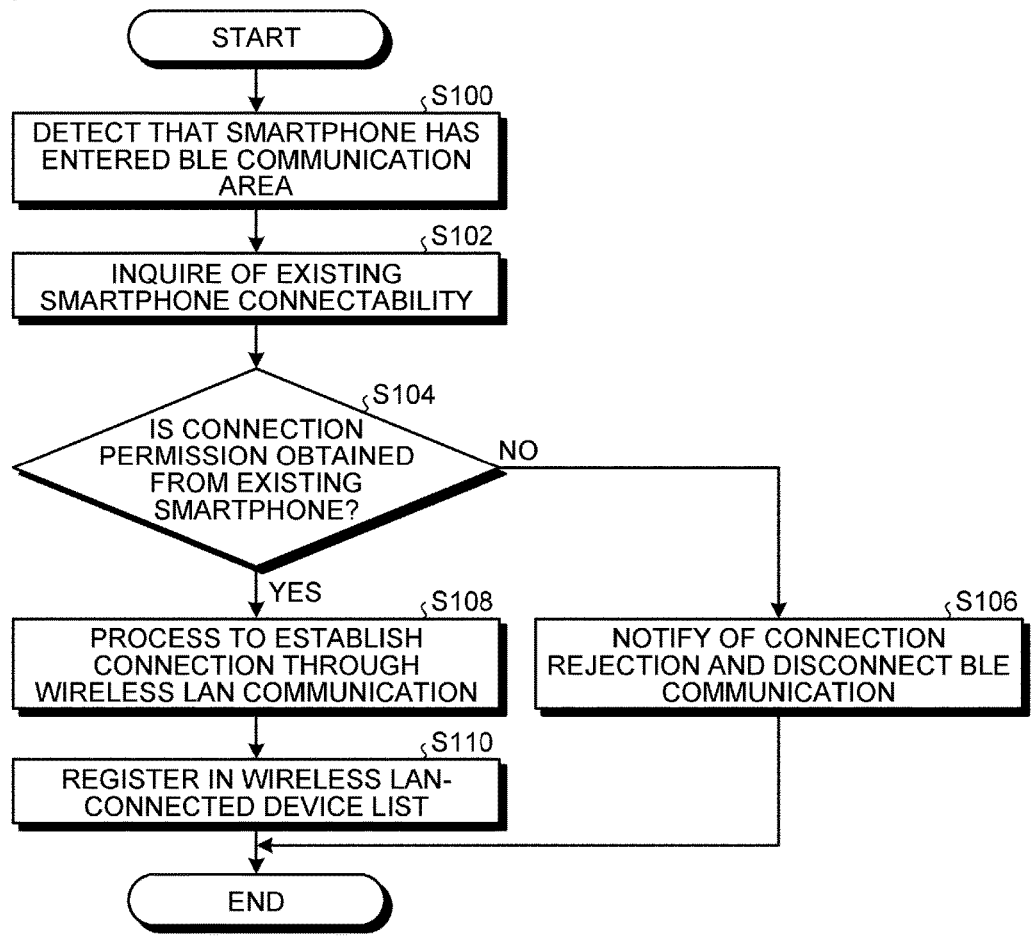
[Fig. 19]
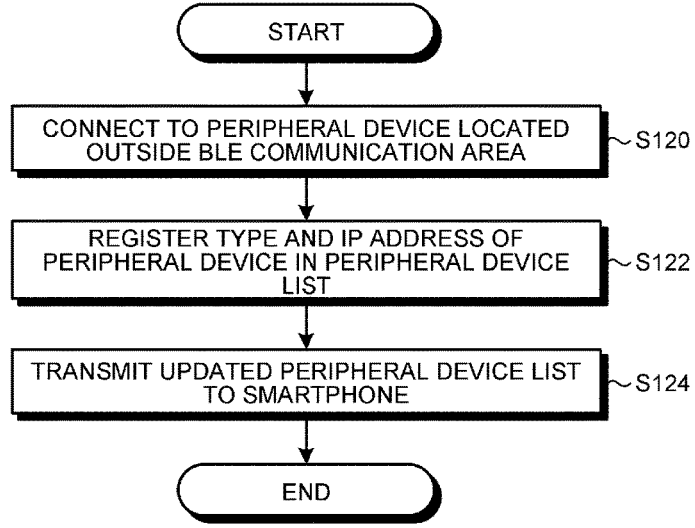

[Fig. 20]
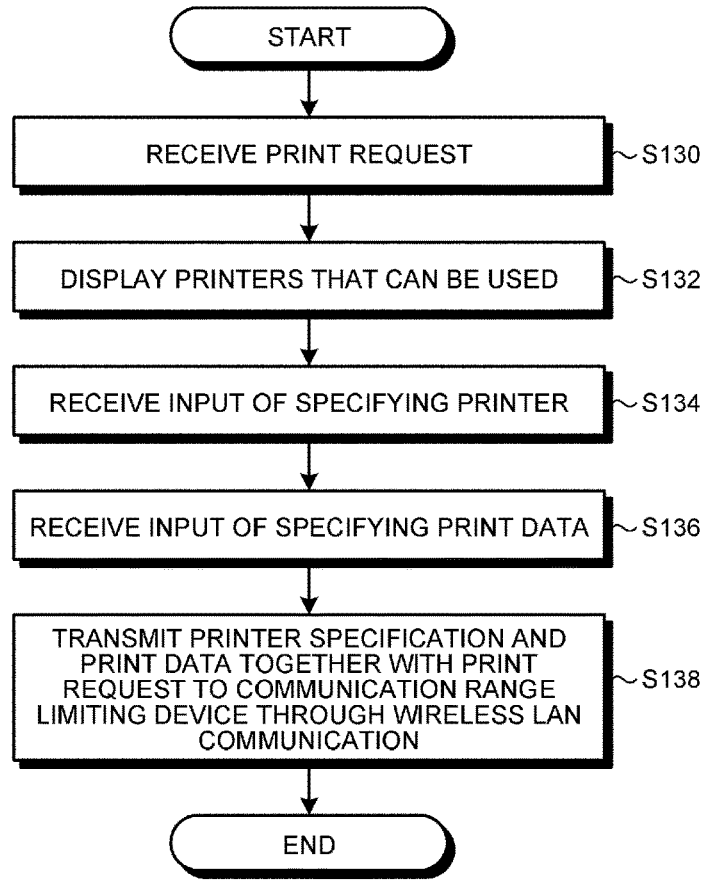
[Fig. 21]
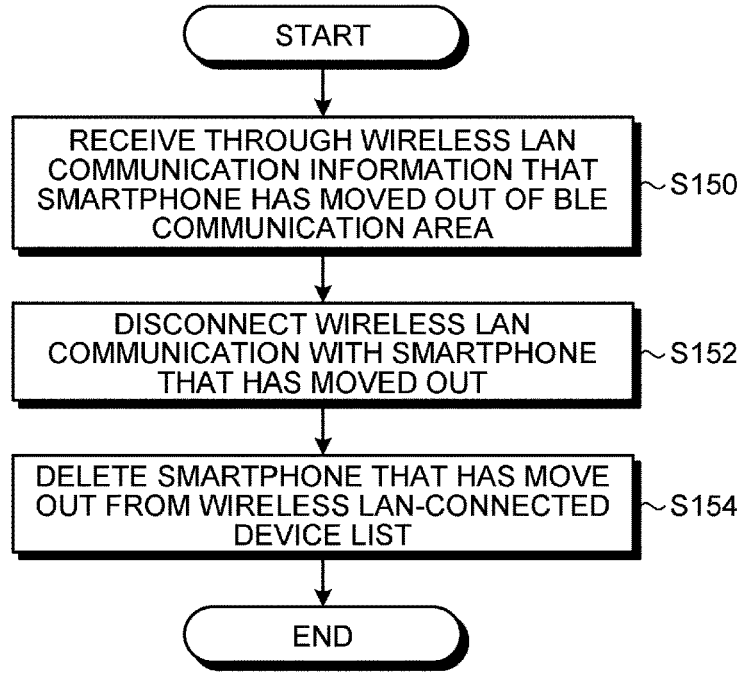

[Fig. 22]
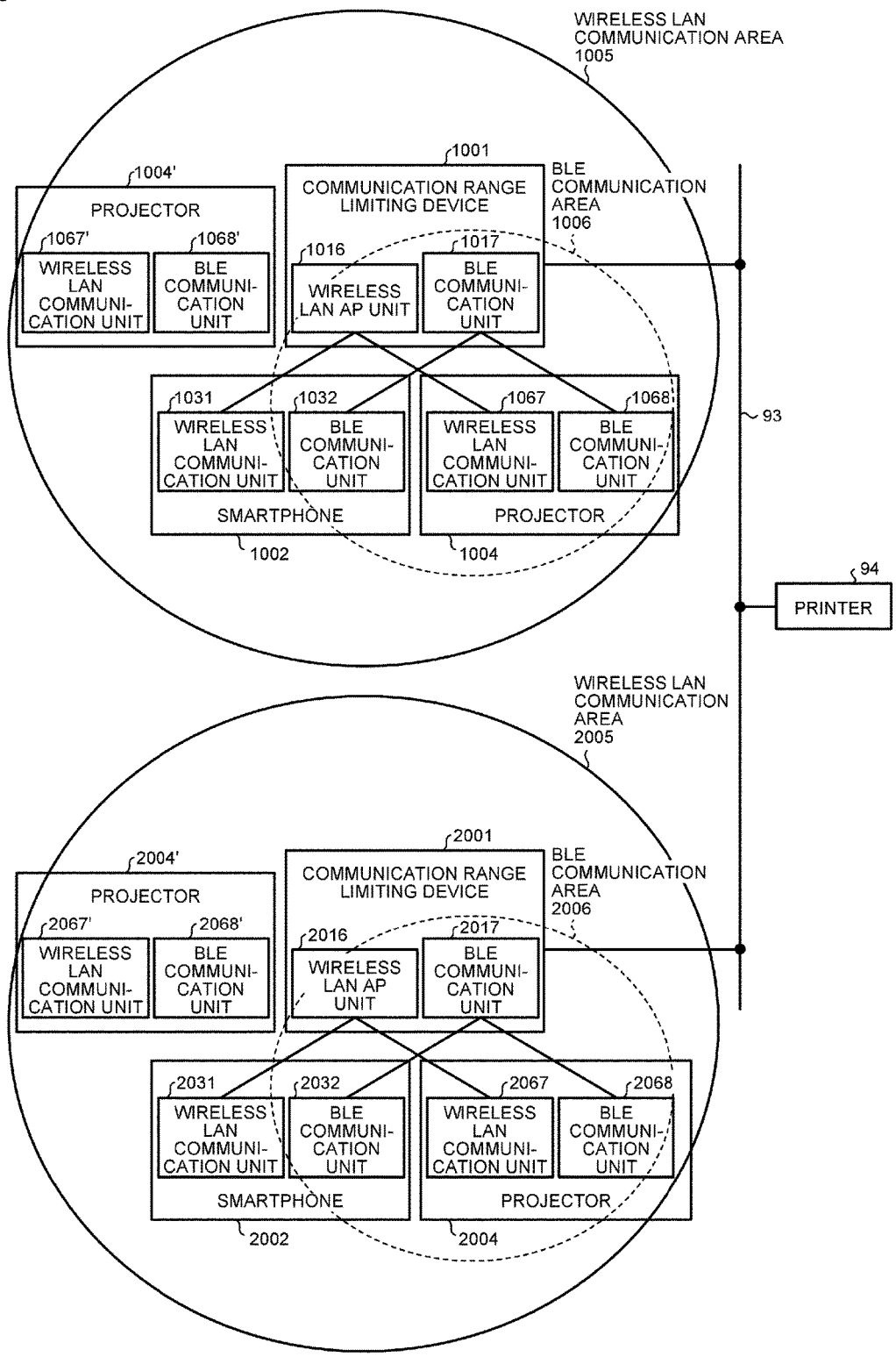

[Fig. 23]
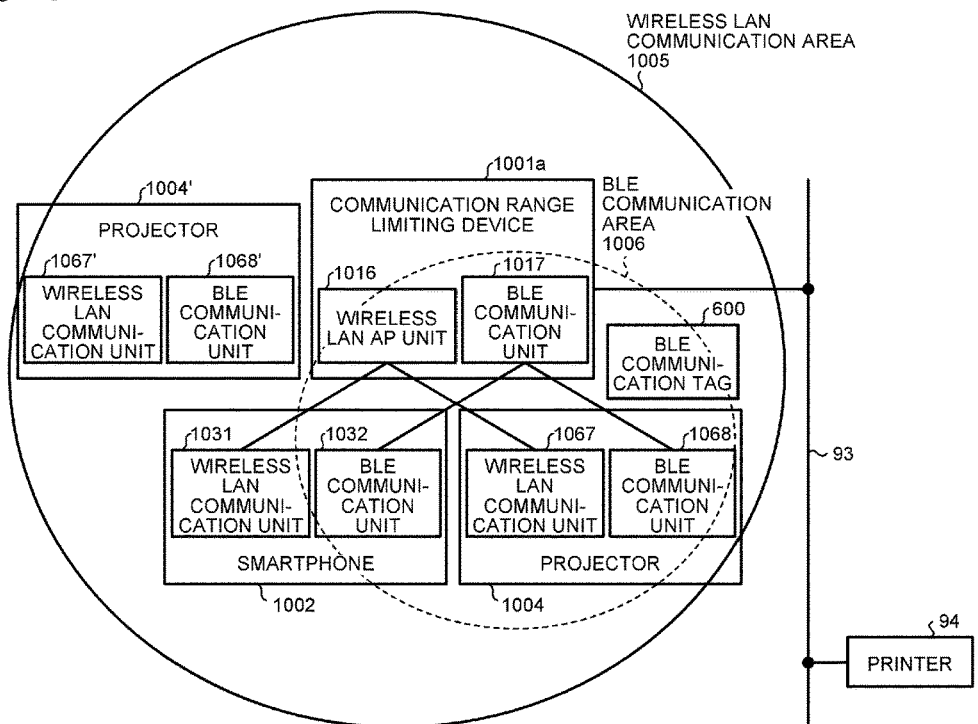
[Fig. 24]
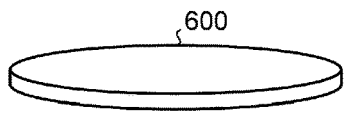

[Fig. 25]
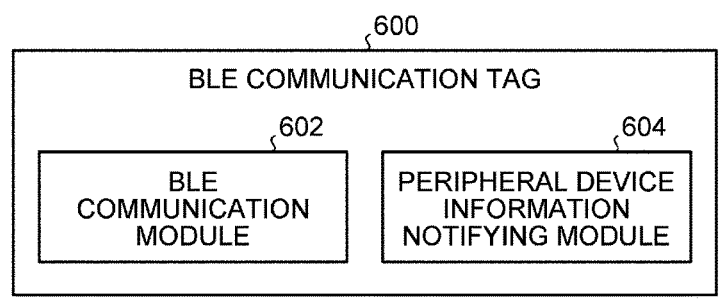
[Fig. 26]
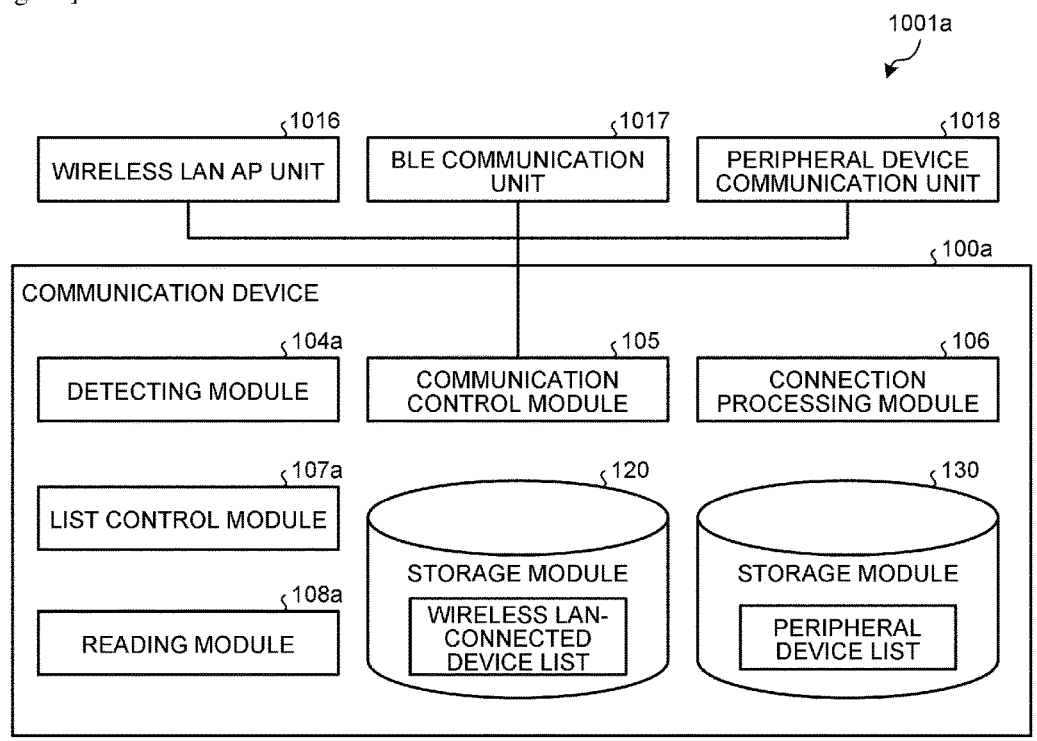

[Fig. 27]
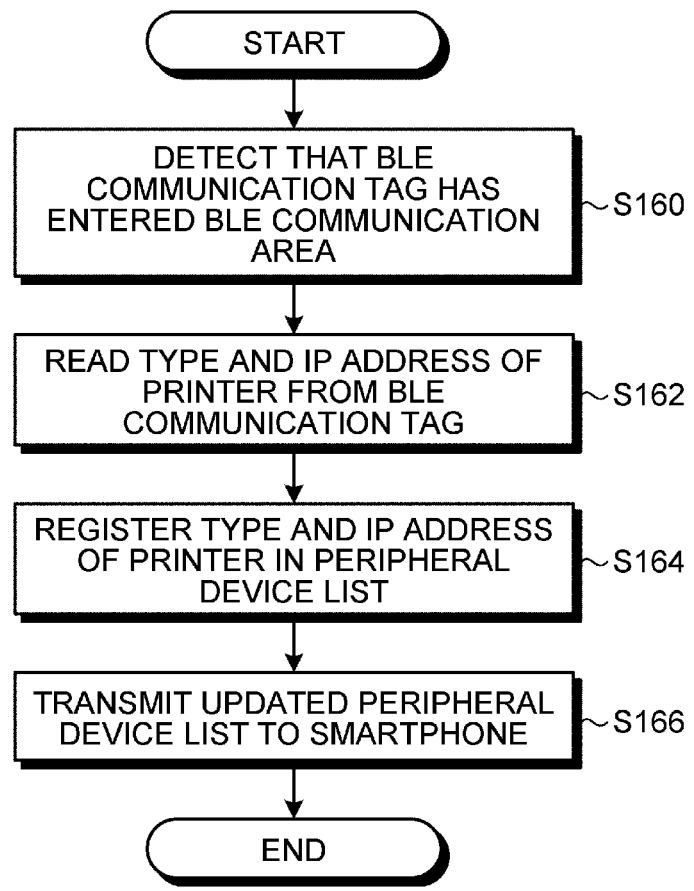

US 10,321,516 B2

COMMUNICATION DEVICE, SYSTEM, AND COMPUTER PROGRAM PRODUCT

TECHNICAL FIELD

The present invention relates to a communication device, a system, and a computer program product.

BACKGROUND ART

Ad hoc networks that utilize wireless networks represented by wireless local area networks (LANs) are known today. In use a device (peripheral device) connected to such a network, as a means for authentication for obtaining permission to connect to the ad hoc network, one known approach is to use another type of short-range communication (e.g., near field communication (NFC)) that has a narrower communication range than the ad hoc network has.

One known communication terminal device, for example, exchanges authentication information, such as a shared key and a public key, with another using another type of short-range communication in their attempt to connect to an ad hoc network, to thereby connect to the ad hoc network (see Patent Literature 1).

SUMMARY OF INVENTION

Technical Problem

Unfortunately, however, the known technique that uses the ad hoc network established by authentication through the short-range communication allows only those devices located within a short range to connect to the ad hoc network. Specifically, any device disposed outside a communication range of the short-range communication cannot be used by way of the ad hoc network. For an ad hoc network built for each conference room, for example, no connection can be established with a device (e.g., a printer device) that is not disposed in each conference room, but is shared among a plurality of conference rooms.

In view of the foregoing, there is a need to provide a communication device, a system, and a computer program product that enable use of a device disposed outside a communication range of short-range communication that is used for acquiring information required for connection.

Solution to Problem

To solve the foregoing problem and achieve the object, an aspect of the present invention provides a communication device that includes a first communication unit that performs communication with another communication device using a first communication scheme that enables communication in a first range. The first communication unit performs, when having determined that another communication device received transmitted certain information, communication with the other communication device in a second range that is different from the first range and in which the other communication device can receive the certain information. The communication device relays communication from the other communication device to another device disposed outside the second range.

Advantageous Effect of Invention

An embodiment provides an advantageous effect that use of a device disposed outside a communication range of short-range communication that is used for acquiring information required for connection is enabled.

BRIEF DESCRIPTION OF DRAWINGS

FIG. 1 is a system configuration diagram illustrating a basic configuration of a wireless LAN communication system.

FIG. 2 is a hardware configuration diagram illustrating a communication range limiting device disposed in the wireless LAN communication system that is a basic configuration.

FIG. 3 is a hardware configuration diagram illustrating a smartphone device disposed in the wireless LAN communication system that is the basic configuration.

FIG. 4 is a hardware configuration diagram illustrating a printer device disposed in the wireless LAN communication system that is the basic configuration.

FIG. 5 is a hardware configuration diagram illustrating a projector device disposed in the wireless LAN communication system that is the basic configuration.

FIG. 6 is a functional block diagram of the communication range limiting device disposed in the wireless LAN communication system that is the basic configuration.

FIG. 7 is a functional block diagram of the smartphone disposed in the wireless LAN communication system that is the basic configuration.

FIG. 8 is a functional block diagram of the printer device disposed in the wireless LAN communication system that is the basic configuration.

FIG. 9 is a sequence diagram illustrating that a smartphone that has moved into a BLE communication area within a wireless LAN communication area establishes a wireless LAN communication line in the wireless LAN communication system that is the basic configuration.

FIG. 10 is a sequence diagram illustrating that a printer device disposed in the BLE communication area within the wireless LAN communication area establishes a wireless LAN communication line in the wireless LAN communication system that is the basic configuration.

FIG. 11 is a flowchart illustrating that a smartphone connected to a wireless LAN remotely controls and causes a printer device to produce a printed matter in the wireless LAN communication system that is the basic configuration.

FIG. 12 is a sequence diagram illustrating that a wireless LAN communication line (and a BLE communication line) is disconnected when a smartphone connected in the BLE communication area to a printer device through a wireless LAN moves out of the BLE communication area in the wireless LAN communication system that is the basic configuration.

FIG. 13 is a system configuration diagram illustrating an exemplary case in which at least part of the BLE communication area is disposed outside the wireless LAN communication area in the wireless LAN communication system that is the basic configuration.

FIG. 14 is a general configuration diagram of a communication system according to a first embodiment.

FIG. 15 is a diagram of a functional configuration of a communication range limiting device according to the first embodiment.

FIG. 16 is a diagram illustrating an exemplary storage format of a wireless LAN-connected device list and a peripheral device list.

FIG. 17 is a diagram of a functional configuration of the smartphone according to the first embodiment.

FIG. 18 is a flowchart illustrating steps to be performed for registering a smartphone in the communication range limiting device according to the first embodiment.

FIG. 19 is a flowchart illustrating steps to be performed for registering a peripheral device in the communication range limiting device according to the first embodiment.

FIG. 20 is a flowchart illustrating steps of a print process to be performed in the smartphone according to the first embodiment via the communication range limiting device.

FIG. 21 is a flowchart illustrating steps to be performed for disconnecting the smartphone in the communication range limiting device according to the first embodiment.

FIG. 22 is a general configuration diagram of a communication system according to a second embodiment.

FIG. 23 is a general configuration diagram of a communication system according to a third embodiment.

FIG. 24 is a diagram illustrating an appearance of an exemplary BLE communication tag.

FIG. 25 is a diagram illustrating a configuration of the BLE communication tag.

FIG. 26 is a diagram illustrating a functional configuration of a communication range limiting device according to the third embodiment.

FIG. 27 is a flowchart illustrating steps to be performed for registering a printer device in the communication range limiting device according to the third embodiment.

DESCRIPTION OF EMBODIMENTS

The following details, with reference to the accompanying drawings, a wireless local area network (LAN) communication system according to embodiments to which the present invention is applied.

Basic Configuration

The following describes a basic configuration of the wireless LAN communication system according to the embodiments to be described hereunder. FIG. 1 is a system configuration diagram illustrating the basic configuration of the wireless LAN communication system. As illustrated in FIG. 1, the wireless LAN communication system includes a communication range limiting device 1, a smartphone 2 as a first device, a printer device 3 as a second device, and a projector device 4 as a third device. It is noted that each device illustrated in FIG. 1 represents only an example and may be replaced by any other device that has a communication function to be described later. For example, a tablet terminal device, a portable gaming machine, a notebook personal computer, or any other portable communication device may be used in place of the smartphone 2.

Basic Configuration of Communication Range Limiting Device

The communication range limiting device 1 forms an access point for a wireless LAN, such as a wireless LAN router. The communication range limiting device 1 forms, as an exemplary local area network, a wireless LAN communication area 5 indicated by the solid-line ellipse in FIG. 1. The communication range limiting device 1 enables communication of each device only in an area narrower than the wireless LAN communication area 5 within the wireless LAN communication area 5. For example, the communication range limiting device 1 enables communication of each device only in a personal area network (PAN) that is narrower than the wireless LAN communication area 5 within the wireless LAN communication area 5.

Exemplarily, a Bluetooth (registered trademark) PAN that performs Bluetooth (registered trademark) Low Energy (BLE) communication consuming ultra-low electric power may be used as the personal area network. In FIG. 1, a communication range indicated by the dotted-line ellipse is a BLE communication area 6 by the Bluetooth (registered trademark) PAN. The following description assumes that the personal area network is the Bluetooth PAN. Nonetheless, non-contact wireless communication (Near Field Communications (NFC)), milliwave wireless communication, QR code (registered trademark), visible light, environmental sound, and ultrasonic waves may, for example, be used instead of the Bluetooth.

Basic Hardware Configuration of Communication Range Limiting Device

FIG. 2 illustrates a basic hardware configuration of the communication range limiting device 1. As illustrated in FIG. 2, the communication range limiting device 1 includes a central processing unit (CPU) 11, a read only memory (ROM) 12, a random access memory (RAM) 13, a hard disk drive (HDD) 14, an input/output interface (input/output I/F) 15, a wireless LAN AP unit 16 (AP stands for access point), and a BLE communication unit 17. The elements from the CPU 11 to the BLE communication unit 17 are connected to each other via a bus line 18.

The ROM 12 stores a communication control program for enabling communication of each device only in the BLE communication area 6 within the wireless LAN communication area 5. The communication control program may be stored in the RAM 13, the HDD 14, or other storage unit. The CPU 11 operates in accordance with the communication control program to thereby control the wireless LAN AP unit 16 and the BLE communication unit 17, controlling to enable communication of each device only in the BLE communication area 6 within the wireless LAN communication area 5.

In FIGS. 1 and 2, the communication range limiting device 1 is illustrated as a standalone device. The communication range limiting device 1 may, however, be incorporated in each device, for example, in a printer device or a multifunction peripheral (MFP).

Basic Hardware Configuration of Smartphone

FIG. 3 illustrates a hardware configuration of the smartphone 2. As illustrated in FIG. 3, the smartphone 2 includes a CPU 21, a ROM 22, a RAM 23, a display unit 24, a microphone unit 25, and a speaker unit 26. The smartphone 2 further includes an input/output I/F 28, a wireless communication unit 29, a camera unit 30, a wireless LAN communication unit 31, and a BLE communication unit 32. The elements from the CPU 21 to the BLE communication unit 32 are connected to each other via a bus line 33.

The ROM 22 stores a communication control program for enabling communication of each device only in the BLE communication area 6 within the wireless LAN communication area 5. The communication control program may be stored in the RAM 23 or other storage unit. The CPU 21 operates in accordance with the communication control program to thereby control the wireless LAN communication unit 31 and the BLE communication unit 32. The CPU 21 thereby enables BLE communication in the BLE communication area 6 within the wireless LAN communication area 5.

The display unit 24 integrates a touch panel formed of a transparent electrode with a display panel to thereby form what is called a touch panel-mounted display unit. The wireless communication unit 29 performs communication of, for example, telephone and e-mail via a wireless base station operating on a predetermined carrier.

Basic Hardware Configuration of Printer Device

FIG. 4 illustrates a basic hardware configuration of the printer device 3. As illustrated in FIG. 4, the printer device 3 includes a CPU 41, a ROM 42, a RAM 43, an operating panel 44, and a printer mechanism 45. The printer device 3 further includes an HDD 46, a wireless LAN communication unit 47, a BLE communication unit 48, a wired communication unit 49, and an input/output I/F 50. The elements from the CPU 41 to the input/output I/F 50 are connected to each other via a bus line 51.

The ROM 42 stores a communication control program for enabling communication of each device only in the BLE communication area 6 within the wireless LAN communication area 5. The communication control program may be stored in the RAM 43, the HDD 46, or other storage unit. The CPU 41 operates in accordance with the communication control program to thereby control the wireless LAN communication unit 47 and the BLE communication unit 48. The CPU 41 thereby enables BLE communication in the BLE communication area 6 within the wireless LAN communication area 5. Additionally, the printer mechanism 45 performs printing of, for example, images and texts, in accordance with a print setup specified from the smartphone 2.

Basic Hardware Configuration of Projector Device

FIG. 5 illustrates a basic hardware configuration of the projector device 4. As illustrated in FIG. 5, the projector device 4 includes an input interface unit (input IF unit) 61, an image processing unit 62, an illuminating optical system 63, a RAM 64, and an operating unit 65. The projector device 4 further includes a receiving unit 66 that receives commands from a remote controller 70 through infrared communication, a wireless LAN communication unit 67, a BLE communication unit 68, and a CPU 69.

The projector device 4 receives image information that corresponds to a projected image supplied to the input IF unit 61 thereof. The image information is subjected to predetermined image processing including distortion correction performed by the image processing unit 62 before being projected onto, for example, a screen by the illuminating optical system 63.

The RAM 64 stores a communication control program for enabling communication of each device only in the BLE communication area 6 within the wireless LAN communication area 5. The communication control program may be stored in a ROM, a HDD, or other storage unit. The CPU 69 operates in accordance with the communication control program to thereby control the wireless LAN communication unit 67 and the BLE communication unit 68. The CPU 69 thereby enables BLE communication in the BLE communication area 6 within the wireless LAN communication area 5.

Basic Software Configuration of Communication Range Limiting Device

FIG. 6 is a block diagram illustrating functions achieved by the CPU 11 of the communication range limiting device 1 when the CPU 11 operates in accordance with the communication control program. As illustrated in FIG. 6, the CPU 11 of the communication range limiting device 1 executes the communication control program to thereby function as a device connecting module 75, a peripheral device connecting module 76, a withdrawal detecting module 77, a wireless LAN AP control module 78, and a BLE communication control module 79.

It is noted that the following description of this example assumes that the elements from the device connecting module 75 to the BLE communication control module 79 are achieved as software functions by the communication control program. The elements from the device connecting module 75 to the BLE communication control module 79 may nonetheless be achieved in part or in whole by an integrated circuit (IC) or by hardware.

The communication control program of the communication range limiting device 1 may be recorded and provided in a computer-readable recording medium such as a CD-ROM and a flexible disk (FD) as an installable or executable file. The communication control program of the communication range limiting device 1 may even be recorded and provided in a computer-readable recording medium such as a CD-R, a digital versatile disk (DVD), a Blu-ray disc (registered trademark), and a semiconductor memory. The communication control program of the communication range limiting device 1 may still be provided by being installed via a network such as the Internet. The communication control program of the communication range limiting device 1 may still be embedded and provided in a ROM of a device, for example.

Basic Software Configuration of Smartphone

FIG. 7 is a block diagram illustrating functions achieved by the CPU 21 of the smartphone 2 when the CPU 21 operates in accordance with the communication control program. As illustrated in FIG. 7, the CPU 21 of the smartphone 2 operates in accordance with the communication control program to thereby function as a print request module 81, a wireless LAN communication control module 82, and a BLE communication control module 83. The print request module 81 achieves a function of remotely operating the printer device 3 through BLE communication to thereby cause the printer device 3 to print a desired image or text, for example.

It is noted that the following description of this example assumes that the elements from the print request module 81 to the BLE communication control module 83 are achieved as software functions by the communication control program. The elements from print request module 81 to the BLE communication control module 83 may nonetheless be achieved in part or in whole by an integrated circuit (IC) or by hardware.

The communication control program of the smartphone 2 may be recorded and provided in a computer-readable recording medium such as a CD-ROM and a flexible disk (FD) as an installable or executable file. The communication control program of the smartphone 2 may even be recorded and provided in a computer-readable recording medium such as a CD-R, a digital versatile disk (DVD), a Blu-ray disc (registered trademark), and a semiconductor memory. The communication control program of the smartphone 2 may still be provided by being installed via a network such as the Internet. The communication control program of the smartphone 2 may still be embedded and provided in a ROM of a device, for example.

Basic Software Configuration of Printer Device

FIG. 8 is a block diagram illustrating functions achieved by the CPU 41 of the printer device 3 when the CPU 41 operates in accordance with the communication control program. As illustrated in FIG. 8, the CPU 41 of the printer device 3 operates in accordance with the communication control program to thereby function as a print module 85, a wireless LAN communication control module 86, and a BLE communication control module 87. The print module 85 achieves a function to control the printer mechanism 45 to print an image, text, or the like requested by the smartphone 2.

It is noted that the following description of this example assumes that the elements from the print module 85 to the BLE communication control module 87 are achieved as software functions. The elements from print module 85 to the BLE communication control module 87 may nonetheless be achieved in part or in whole by an integrated circuit (IC) or by hardware.

The communication control program of the printer device 3 may be recorded and provided in a computer-readable recording medium such as a CD-ROM and a flexible disk (FD) as an installable or executable file. The communication control program of the printer device 3 may even be recorded and provided in a computer-readable recording medium such as a CD-R, a DVD, a Blu-ray disc (registered trademark), and a semiconductor memory. The communication control program of the printer device 3 may still be provided by being installed via a network such as the Internet. The communication control program of the printer device 3 may still be embedded and provided in a ROM of a device, for example.

Outline of Basic Operations of Wireless LAN Communication System

In the wireless LAN communication system, the outer ellipse indicated by the solid line in FIG. 1 represents a wireless LAN communication-enabled range (the wireless LAN communication area 5) formed by the wireless LAN AP unit 16 of the communication range limiting device 1. The smartphone 2, the printer device 3, and the projector device 4 are disposed inside this wireless LAN communication area 5.

The smartphone 2 communicates with the printer device 3, the projector device 4, and other peripheral devices having the wireless LAN communication function to thereby be capable of remote control of, for example, printing of a desired image, text, or the like and projection of an image or the like via the wireless LAN.

The printer device 3, the projector device 4, and other peripheral devices include the wireless LAN communication units 47 and 67 and the BLE communication units 48 and 68. This arrangement enables BLE communication with the BLE communication unit 17 of the communication range limiting device 1. As indicated by the dotted-line ellipse in FIG. 1, however, the BLE communication area 6 is narrower than the wireless LAN communication area 5. Thus, whereas the BLE communication is enabled between each of the smartphone 2 and the printer device 3 that are disposed inside the BLE communication area 6, and the communication range limiting device 1, the BLE communication is disabled between the projector device 4 disposed outside the BLE communication area 6 and the communication range limiting device 1.

Specifically, the wireless LAN communication system performs the wireless LAN setup through the BLE communication as will be described later. As a result, only the smartphone 2 and the printer device 3 that are capable of the BLE communication can actually perform communication using the wireless LAN. The wireless LAN setup cannot be performed for the projector device 4 that is incapable of the BLE communication, even though the projector device 4 is disposed inside the wireless LAN communication area 5, so that the wireless LAN communication is disabled with the projector device 4.

Basic Connection Operation with Respect to Smartphone

FIG. 9 is a sequence diagram illustrating that the smartphone 2 that has moved into the BLE communication area 6 within the wireless LAN communication area 5 establishes a wireless LAN communication line. The device connecting module 75 of the communication range limiting device 1 transmits, for example, an advertisement packet through three advertisement channels from the BLE communication control module 79 via the BLE communication unit 17 to thereby notify a peripheral device of presence of the communication range limiting device. The advertisement packet includes communication range information that indicates the BLE communication area 6. Step S1 denotes the transmission of the advertisement packet including the communication range information that indicates the BLE communication area 6.

When the smartphone 2 is located within the BLE communication area 6, the BLE communication unit 32 of the smartphone 2 receives the advertisement packet (the communication range information) that has been transmitted from the communication range limiting device 1. By referring to the received communication range information, the smartphone 2 determines whether the smartphone 2 is located within the BLE communication area 6. A result of this determination is transmitted to the communication range limiting device 1 through the BLE communication as a response denoted by Step S2. If the smartphone 2 is located within the BLE communication area 6, the BLE communication unit 32 of the smartphone 2 and the BLE communication unit 17 of the communication range limiting device 1 perform pairing for the BLE communication (BLE pairing) at Step S3. The BLE pairing enables the BLE communication between the smartphone 2 and the communication range limiting device 1.

When the BLE pairing is completed, the device connecting module 75 of the communication range limiting device 1 uses the BLE communication to transmit to the smartphone 2 at Step S4 a PIN code (unique identification information) of the WPS system that facilitates wireless LAN connection and is standardized by Wi-Fi Alliance. Additionally, the device connecting module 75 of the communication range limiting device 1 transfers to the wireless LAN AP unit 16, at Step S6, the PIN code that has been transmitted to the smartphone 2, thereby issuing a command to prepare for starting communication by the WPS system. The wireless LAN AP unit 16 of the communication range limiting device 1 performs setup for the WPS system using the PIN code transmitted to the smartphone 2 at Step S8.

The BLE communication unit 32 of the smartphone 2, having received the PIN code of the WPS system from the communication range limiting device 1, transfers at Step S5 the received PIN code to the wireless LAN communication unit 31, thereby issuing a command to prepare for starting communication by the WPS system. At Step S7, the wireless LAN communication unit 31 performs setup for the WPS system using the PIN code transferred from the communication range limiting device 1. This establishes Wi-Fi connection (wireless LAN connection) between the smartphone 2 and the communication range limiting device 1 by the WPS system through the use of the PIN code.

As described above, the wireless LAN communication system automatically completes the Wi-Fi connection (wireless LAN connection) when the smartphone 2 is located within the BLE communication area 6 of the communication range limiting device 1. This automatic connection establishment relieves the user of setup knowledge about the wireless LAN and a troublesome operation to input the PIN code. In addition, encrypted information is transmitted and received among different devices in BLE communication, so that the PIN code can be transmitted and received with security.

Next, at Step S10, the BLE communication control module 83 of the smartphone 2 and the BLE communication control module 79 of the communication range limiting device 1 temporarily disconnect the BLE communication in order to enable connection of a new device. Thereafter, at Step S11, the device connecting module 75 of the communication range limiting device 1 transmits an advertisement packet that includes the communication range information indicating the BLE communication area 6, as described previously with reference to Step S1. The device connecting module 75 of the communication range limiting device 1 then attempts to establish a wireless LAN communication line with a device such as the smartphone 2 located in the BLE communication area 6 through the BLE communication as described previously.

Basic Connection Operation with Respect to Printer Device

FIG. 10 is a sequence diagram illustrating that the printer device 3 disposed in the BLE communication area 6 within the wireless LAN communication area 5 establishes a wireless LAN communication line. The printer device 3 as a peripheral device effectively functions when it receives a print request from a device that makes a print request, such as the smartphone 2. Thus, to establish wireless LAN communication with the printer device 3, preferably, the smartphone 2 or the like that controls the printer device 3 has previously been connected to the wireless LAN. The sequence diagram illustrated in FIG. 10 assumes that the smartphone 2 has already been connected to the wireless LAN (see the description for FIG. 9). The sequence diagram illustrated in FIG. 10 starts its process with Step S21 when the transmission of an advertisement packet is enabled by the temporary disconnection of the BLE communication between the smartphone 2 and the communication range limiting device 1 at Step S10 illustrated in FIG. 9.

The printer device 3 is a stationary device disposed in the BLE communication area 6 of the communication range limiting device 1. At Step S21, the printer device 3 transmits, at regular intervals and through the abovementioned three advertisement channels, an advertisement packet that includes connection inquiry information for inquiring whether a device to make a print request such as the smartphone 2 has been connected to the wireless LAN to the communication range limiting device 1 via the BLE communication unit 48. The peripheral device connecting module 76 of the communication range limiting device 1 illustrated in FIG. 6 transmits, at Step S22 to the printer device 3 via the BLE communication unit 17, a response that indicates whether a device to make a print request has been connected.

If a device to make a print request such as the smartphone 2 has been connected to the wireless LAN, the peripheral device connecting module 76 of the communication range limiting device 1 and the BLE communication unit 48 of the printer device 3 perform pairing for the BLE communication (BLE pairing) at Step S23. The BLE pairing enables the BLE communication between the printer device 3 and the communication range limiting device 1.

When the BLE pairing is completed, the peripheral device connecting module 76 of the communication range limiting device 1 transmits to the printer device 3 at Step S24 a PIN code of the WPS system that facilitates wireless LAN connection and is standardized by Wi-Fi Alliance. Additionally, the communication range limiting device 1 transfers, at Step S26 to the wireless LAN AP unit 16, the PIN code that has been transmitted to the printer device 3, thereby issuing a command to prepare for starting communication by the WPS system. The wireless LAN AP unit 16 of the communication range limiting device 1 performs setup for the WPS system using the PIN code transmitted to the printer device 3 at Step S28.

The BLE communication unit 48 of the printer device 3, having received the PIN code of the WPS system from the communication range limiting device 1, transfers at Step S25 the received PIN code to the wireless LAN communication unit 47, thereby issuing a command to prepare for starting communication by the WPS system. At Step S27, the wireless LAN communication unit 47 performs setup for the WPS system using the PIN code transferred from the BLE communication unit 48. This establishes Wi-Fi connection (wireless LAN connection) between the printer device 3 and the communication range limiting device 1 by the WPS system through the use of the PIN code.

Next, at Step S30, the BLE communication unit 48 of the printer device 3 and the BLE communication unit 17 of the communication range limiting device 1 temporarily disconnect the BLE communication in order to enable connection of a new device. Thereafter, at Step S31, the BLE communication unit 48 of the printer device 3 transmits an advertisement packet that includes the connection inquiry information, as described previously with reference to Step S21. When a device to make a print request is connected to the wireless LAN, the communication range limiting device 1 establishes a wireless LAN communication line with the printer device 3 located in the BLE communication area 6 through the BLE communication as described previously.

Print Operation

The flowchart illustrated in FIG. 11 illustrates that the smartphone 2 connected to the wireless LAN remotely controls and causes the printer device 3 to produce a printed matter. As described previously, the mutual connection established between the smartphone 2 and the printer device 3 via the wireless LAN communication units 31 and 47 in the wireless LAN enables remote control of the printer device 3 by the smartphone 2.

When using the smartphone 2 to remotely control the printer device 3, the user operates to start a print application program stored in memory of, for example, the ROM 22 of the smartphone 2. When the print application program is started to operate, the print request module 81 of the smartphone 2 illustrated in FIG. 7 makes a print request to the printer device 3 via the wireless LAN communication control module 82 and the wireless LAN communication unit 31 at Step S41. The print module 85 of the printer device 3 illustrated in FIG. 8, upon receipt of the print request, inquires a device to be used for printing of the smartphone 2 via the wireless LAN communication unit 47 at Step S42. If data stored in the smartphone 2 is to be printed, the user notifies the printer device 3 that the device to be used for printing is the smartphone 2 through the wireless LAN communication. If an image projected with the projector device 4, for example, is to be printed, the user notifies the printer device 3 that the device to be used for printing is the projector device 4 through the wireless LAN communication.

At Step S43, the print module 85 of the printer device 3 inquires data to be printed of the smartphone 2 through the wireless LAN communication. If data, such as an image or text, stored in the smartphone 2 is to be printed, the user notifies the printer device 3 that the data to be printed is data stored in the smartphone 2 through the wireless LAN communication. Alternatively, if an image or other data projected with the projector device 4 is to be printed, the user notifies the printer device 3 that the data to be printed is data projected with the projector device 4 through the wireless LAN communication. Finally, at Step S44, the print module 85 of the printer device 3 executes printing by acquiring the data specified by the user from the device specified by the user (the smartphone 2 or the projector device 3) through the wireless LAN communication.

Device Disconnecting Operation

FIG. 12 is a sequence diagram illustrating that the wireless LAN communication line (and the BLE communication line) is disconnected when the smartphone 2 connected in the BLE communication area 6 to the printer device 3 through the wireless LAN moves out of the BLE communication area 6. At Step S51, as described previously, the communication range information that indicates the communication range corresponding to the BLE communication area 6 is transmitted from the BLE communication unit 17 of the communication range limiting device 1 to the smartphone 2 through the BLE communication. The smartphone 2 compares the position of the communication range limiting device detected by, for example, its global positioning system (GPS) with the BLE communication area 6 indicated by the communication range information. The smartphone 2, when having detected that the communication range limiting device is outside the BLE communication area 6, instructs the wireless LAN communication unit 31 to disconnect the wireless LAN (Wi-Fi disconnection command) at Step S52.

It is noted that, in this example, the communication range limiting device 1 transmits the communication range information to the smartphone 2 and the smartphone 2 compares the current position of the communication range limiting device with the BLE communication area 6 indicated by the communication range information to thereby detect withdrawal from the BLE communication area 6. Another arrangement may nonetheless be made in which the smartphone 2 transmits the current position of the communication range limiting device detected with the GPS or the like to the communication range limiting device 1 through the BLE communication and the communication range limiting device 1 compares the current position of the smartphone 2 with the BLE communication area 6 to thereby detect withdrawal of the device such as the smartphone 2 from the BLE communication area 6. In this arrangement, the withdrawal detecting module 77 illustrated in FIG. 6 is to detect the withdrawal of the device such as the smartphone 2 from the BLE communication area 6.

The wireless LAN communication unit 31 of the smartphone 2, when instructed by the BLE communication unit 32 to disconnect the wireless LAN, requests the communication range limiting device 1 to disconnect the wireless LAN using the wireless LAN communication at Step S53. The communication range limiting device 1, upon receipt of the wireless LAN disconnection request, disconnects the wireless LAN communication line associated with the device that has made the wireless LAN disconnection request as indicated by Step S54. This disconnects the wireless LAN communication line for not only the smartphone 2, but also the printer device 3.

To re-establish the wireless LAN communication line after it has been disconnected, the communication range limiting device 1 renews the PIN code. As a result, when the smartphone 2 that has moved out of the BLE communication area 6 re-enters the BLE communication area 6, the wireless LAN communication line is established using a PIN code different from the previous one.

As described above, the wireless LAN communication system can automatically disconnect the wireless LAN communication line and the BLE communication line when the smartphone 2 moves out of the BLE communication area 6. This capability allows the range in which the smartphone 2 can be connected to the wireless LAN to be limited to a predetermined range (within the BLE communication area 6). In addition to the smartphone 2 that has moved out of the BLE communication area 6, the wireless LAN communication system further disconnects the wireless LAN communication line of the printer device 3 that has been communicating with the smartphone 2. This arrangement prevents an inconvenience in which the connection of the printer device 3 to the wireless LAN communication line that is no longer used as a result of the disconnection of the wireless LAN communication line with respect to the smartphone 2 continues to exist wastefully, so that an even greater communication security can be achieved. Specifically, even a user who is not authorized to connect to a local network such as an in-house LAN is temporarily and simply allowed to have his or her device connected to the local network and to use his or her device, while security of the local network is ensured.

Additionally, the PIN code is renewed when the wireless LAN communication line that has previously been disconnected is to be re-established. This arrangement prevents the following illegal act: the smartphone 2 that has moved out of the BLE communication area 6 reuses the PIN code used in the last connection to thereby attempt to intercept another device through the wireless LAN communication.

When the smartphone 2 moves out of the BLE communication area 6, the wireless LAN communication line is disconnected of the printer device 3 that has been communicating with the smartphone 2 as well as the smartphone 2. This arrangement prevents an inconvenience in which the connection of the printer device 3 to the wireless LAN communication line that is no longer used as a result of the disconnection of the wireless LAN communication line with respect to the smartphone 2 continues to exist wastefully, so that an even greater communication security can be achieved.

It is noted that a public key may be delivered in place of the PIN code of the WPS system that is delivered from the communication range limiting device 1 to a device such as the smartphone 2 through the BLE communication when the wireless LAN communication line is to be established. The wireless LAN communication line may be established by delivering, in place of the PIN code of the WPS system, a public key according to the Diffie-Hellman key exchange method, for example. In this case, the public key is transmitted and received within the BLE communication area 6, so that a wireless LAN administrator can monitor the transmission and reception of the public key. This approach clarifies, for example, the specific device that transmits the public key, the specific device that receives the public key, and the specific user. Thus, illegal communications by an illegal user and an illegal device, what is called spoofing, can be prevented. In addition, when the wireless LAN communication line that has previously been disconnected is to be re-established, preferably, a new public key different from the previous one is used as with the PIN code described previously.

Additionally, the PIN code or the public key may be transmitted by sound (an acoustic output propagating through a space) from the communication range limiting device 1 to a device such as the smartphone 2 or the printer device 3. Because the acoustic output offers spatial transmissibility poorer than that of the radio waves used in the BLE communication, the transmission and reception range of the PIN code, for example, can be limited to a range over which sound can be transmitted and received between devices. Thus, the PIN code or the like is transmitted and received in a narrow range which a system administrator, for example, can monitor. As a result, illegal communications by an illegal user and an illegal device, what is called spoofing, mentioned previously can be prevented even more reliably.

Additionally, presence of a device within the BLE communication area 6 may be monitored using received signal strength indication (RSSI) of the BLE communication unit 17 instead of the communication range information. By setting the received signal strength indications of the BLE communication regarded as an exit RSSI area and an entrance RSSI area to desired levels, the range over which connection can be made to the wireless LAN (range of the entrance RSSI area) can be dynamically adjusted within the BLE communication area 6.

The above-described example encompasses the BLE communication area within the wireless LAN communication area. Nonetheless, as illustrated, for example, in FIG. 13, at least part of the BLE communication area may be disposed outside the wireless LAN communication area. In FIG. 13, a BLE communication area 6' represents an area in which the wireless LAN communication line can be established. This is because in a BLE communication area 7 outside the wireless LAN communication area, the setup for performing the wireless LAN communication cannot be made, though communication range information can be received through BLE communication. The condition illustrated in FIG. 13 is possible, for example, in a case in which the wireless LAN AP unit 16 and the BLE communication unit 17 are disposed at different positions and in a case in which the communication-enabled range protrudes in one direction because of communication directivity concerned.

First Embodiment

FIG. 14 is a general configuration diagram of a communication system according to a first embodiment. As illustrated in FIG. 14, the communication system chiefly includes a communication range limiting device 1001 and a smartphone 1002. The communication range limiting device 1001 communicates with the smartphone 1002, a printer device 92, a projector device 1004, and a projector device 1004' under a prescribed condition.

The communication range limiting device 1001 performs communication with another communication device through a wireless LAN AP unit 1016, a BLE communication unit 1017, and a peripheral device communication unit 1018 (see FIG. 15) that serve as means of communication. In addition, the communication range limiting device 1001 has an access point function through wireless LAN communication such as a wireless LAN router.

The wireless LAN AP unit 1016 performs wireless communication through wireless LAN communication in a wireless LAN communication area 1005 (first communication range) illustrated in FIG. 14. The smartphone 1002, the projector device 1004, and the projector device 1004', because being disposed inside the wireless LAN communication area 1005 of the wireless LAN AP unit 1016 in the embodiment, can communicate with the communication range limiting device 1001 through wireless LAN communication. The range enclosed in the wireless LAN communication area 1005 is an ad hoc network that uses the wireless LAN.

The BLE communication unit 1017 performs wireless communication through BLE communication that uses the Bluetooth technology in a BLE communication area 1006 (second communication range) illustrated in FIG. 14. As illustrated in FIG. 14, the BLE communication area 1006 extends over a range inside and narrower than the wireless LAN communication area 1005. In the embodiment, while the smartphone 1002 and the projector device 1004 are located inside the BLE communication area 1006, the projector device 1004' is located outside the BLE communication area 1006. Thus, whereas the smartphone 1002 and the projector device 1004 can communicate with the communication range limiting device 1001 through BLE communication, the projector device 1004' cannot communicate with the communication range limiting device 1001 through BLE communication. The BLE communication unit 1017 transmits an advertisement channel including communication range information indicative of the BLE communication area 1006 and a PIN code for performing wireless LAN communication.

The peripheral device communication unit 1018 performs communication with the printer device 92 (another device) disposed outside the BLE communication area 1006 through a wired network 91 as illustrated in FIG. 14. While the present embodiment is exemplified by a wired connection between the communication range limiting device 1001 and the printer device 92, a configuration is still possible to make the connection through wireless communication. Additionally, in the present embodiment, printer devices and projector devices as the devices used by the smartphone 1002 are referred to as peripheral devices.

In the present embodiment, the wireless LAN AP unit 1016 performs communication through wireless LAN communication in the wireless LAN communication area 1005, the BLE communication unit 1017 performs communication through BLE communication in the BLE communication area 1006, and the peripheral device communication unit 1018 performs communication with a device outside the BLE communication area 1006 through the wired network. This is, however, not the only possible arrangement. Specifically, the embodiment can be applied to an arrangement in which a communication unit that connects the communication range limiting device 1001 to the printer device 92 as a peripheral device has a communication range wider than the wireless LAN communication area 1005. More specifically, an exemplary possible configuration is such that the Bluetooth communication is performed in a communication range that corresponds to the wireless LAN communication area 1005 in the embodiment, NFC communication is performed in a communication range that corresponds to the BLE communication area 1006 in the embodiment, and wireless LAN communication is performed for communication with the printer device 92 as the peripheral device.

The smartphone 1002 is provided with, for example, a user interface (UI). The smartphone 1002 includes a wireless LAN communication unit 1031 and a BLE communication unit 1032. The wireless LAN communication unit 1031 performs communication through wireless LAN communication in the wireless LAN communication area 1005. The BLE communication unit 1032 performs communication through BLE communication in the BLE communication area 1006. The smartphone 1002 performs communication with the printer device 92 or the projector device 1004 as the peripheral device via the communication range limiting device 1001 to thereby use a printing function or a display function.

The printer device 92 prints an image, a character, and the like in accordance with a print request received from the smartphone 1002, for example. In the present embodiment, the printer device 92 is connected to the communication range limiting device 1001 by the wired network 91.

The projector devices 1004 and 1004' project an image or video onto, for example, a large screen to thereby display the image or the video on the large screen. The projector devices 1004 and 1004' include wireless LAN communication units 1067 and 1067' and BLE communication units 1068 and 1068', respectively. The wireless LAN communication units 1067 and 1067' each perform communication through the wireless LAN communication in the wireless LAN communication area 1005. The BLE communication units 1068 and 1068' each perform communication through the BLE communication in the BLE communication area 1006.

The communication system in the present embodiment makes connection setup for the wireless LAN communication through the BLE communication. The BLE communication area 1006 is narrower than the wireless LAN communication area 1005 as illustrated in FIG. 14, so that the communication range limiting device 1001 can perform communication through the BLE communication with the smartphone 1002 and the projector device 1004, but not with the projector device 1004' that is disposed outside the BLE communication area 1006.

Specifically, only the smartphone 1002 and the projector device 1004 that are capable of BLE communication can communicate with the communication range limiting device 1001 through the wireless LAN communication. The projector device 1004' incapable of the BLE communication, even though the projector device 1004' is disposed inside the wireless LAN communication area 1005, is unable to communicate with the communication range limiting device 1001 through the wireless LAN communication.

Thus, in the present embodiment, the smartphone 1002, even though it is able to use the projector device 1004 via the communication range limiting device 1001, is unable to use the projector device 1004'. To use the projector device 1004 through the wireless LAN communication from the smartphone 1002, the projector device 1004' needs to be moved into the inside of the BLE communication area 1006.

Additionally, for the smartphone 1002 to use the printer device 92 via the communication range limiting device 1001, the smartphone 1002 and the communication range limiting device 1001 are required only to be capable of communication with each other through the wireless LAN communication. The printer device 92 can be used from the smartphone 1002 through the following procedure. Specifically, a print request (connection request) is issued from the smartphone 1002 to the communication range limiting device 1001 using the wireless LAN communication and the communication range limiting device 1001 transmits the print request (connection request) to the printer device 92 that is connected to the wired network 91.

FIG. 15 is a diagram of a functional configuration of the communication range limiting device according to the first embodiment. As illustrated in FIG. 15, the communication range limiting device 1001 chiefly includes storage modules 120 and 130, the wireless LAN AP unit 1016, the BLE communication unit 1017, the peripheral device communication unit 1018, a detecting module 104, a communication control module 105, a connection processing module 106, and a list control module 107.

The storage module 120 stores therein a wireless LAN-connected device list that lists types of devices (including smartphones and projector devices) connected through the wireless LAN communication, associated with identification information of the devices. The storage module 120 includes a storage medium such as a HDD and a memory.

The storage module 130 stores therein a peripheral device list (peripheral device information) that lists types of peripheral devices that can be used (including printer devices), associated with identification information of the peripheral devices. The storage module 130 includes a storage medium such as a HDD and a memory. The peripheral devices that can be used denote the peripheral devices with which communication can be performed by the peripheral device communication unit 1018 and the wireless LAN AP unit 1016. Specifically, the peripheral device list associates the types of peripheral devices that can be used via the communication range limiting device 1001 from the smartphone 1002 connected through the wireless LAN communication, with the identification information of these peripheral devices.

The following describes a storage format applied to the wireless LAN-connected device list and the peripheral device list. FIG. 16 is a diagram illustrating an exemplary storage format of the wireless LAN-connected device list and the peripheral device list. In the wireless LAN-connected device list and the peripheral device list, "Type" is associated with "IP address" as illustrated in FIG. 16, in which "Type" indicates a specific type of each device (e.g., whether the device is a printer device, a projector device, or a smartphone) and "IP address" is uniquely assigned to each device. On the basis of these lists, an operation is performed using the smartphone 1002 to, for example, select a specific device (peripheral device) to be communicated with.

The wireless LAN AP unit 1016, the BLE communication unit 1017, and the peripheral device communication unit 1018 have previously been described and descriptions therefor will be here omitted.

The detecting module 104 detects that another communication device such as the smartphone 1002 enters the BLE communication area 1006. For example, the detecting module 104 uses a received signal strength indication (RSSI) parameter of the BLE communication to detect that another communication device enters the BLE communication area 1006.

The communication control module 105 controls communication with other communication devices via the wireless LAN AP unit 1016, the BLE communication unit 1017, and the peripheral device communication unit 1018. Specifically, for example, the communication control module 105 transmits through the BLE communication to the smartphone 1002 setup information (e.g., the PIN code illustrated in FIG. 9) for establishing communication through the wireless LAN communication.

In addition, the communication control module 105 receives a request for connection to a peripheral device from the smartphone 1002 that is connected through the wireless LAN communication and, on the basis of the received connection request, controls communication between the smartphone 1002 and the peripheral device. When, for example, a print request (including print data) from the smartphone 1002 to the printer device 92 is received, the communication control module 105 controls so as to transmit the received print request to the printer device 92 that is connected to the wired network 91. This causes the printer device 92 that has received the print request to perform printing.

Additionally, when the peripheral device list is updated by the list control module 107 as a result of a newly connected device being registered or a previously connected device being disconnected, the communication control module 105 transmits the updated peripheral device list to the smartphone 1002.

The connection processing module 106 causes the communication control module 105 to connect via the wireless LAN AP unit 1016 and the BLE communication unit 1017 to the smartphone 1002 through the wireless LAN communication. Specifically, for example, the connection processing module 106 causes the BLE communication unit 1017 to transmit an advertisement packet that includes the communication range information indicative of the BLE communication area 1006 to the smartphone 1002. The connection processing module 106 causes the BLE communication unit 1017 to receive a response from the smartphone 1002 located in the BLE communication area 1006, to perform pairing, and to thereby perform BLE communication with the smartphone 1002. The connection processing module 106 thereafter causes the wireless LAN AP unit 1016 to transmit setup information to the smartphone 1002. Each device then performs a prescribed setup process for accomplishing wireless LAN communication with the smartphone 1002.

The connection processing module 106 causes the peripheral device communication unit 1018 to connect to the printer device 92 over the wired network 91. It is noted that the communication range limiting device 1001 has a router function and is connected to the wired network 91. A packet can reach the wired network 91 from the ad hoc network built by the wireless LAN communication area 1005.

The list control module 107 controls the wireless LAN-connected device list and the peripheral device list. Specifically, when a connection is established with a device (a smartphone, a projector device, a printer device, or the like) by the wireless LAN AP unit 1016 through the wireless LAN communication, the list control module 107 stores (registers) the type and the IP address of the connected device in the wireless LAN-connected device list. When a connection is established with a printer device or other peripheral device by the peripheral device communication unit 1018, the list control module 107 stores (registers) the type and the IP address of the connected peripheral device in the peripheral device list.

Additionally, when a device stored in the wireless LAN-connected device list is disconnected, the list control module 107 deletes information on the disconnected device from the wireless LAN-connected device list. When a device stored in the peripheral device list can no longer be used, the list control module 107 deletes information on the device that can no longer be used from the peripheral device list.

FIG. 17 is a diagram of a functional configuration of the smartphone according to the first embodiment. As illustrated in FIG. 17, the smartphone 1002 chiefly includes a storage module 220, the wireless LAN communication unit 1031, the BLE communication unit 1032, a display control module 203, an input receiving module 204, a communication control module 205, and a control module 206.

The storage module 220 stores therein the peripheral device list that lists types of peripheral devices (including printer devices) that can be used from the smartphone 1002, associated with identification information of the peripheral devices. The storage module 220 includes a storage medium such as a HDD and a memory. The peripheral devices that can be used from the smartphone 1002 denote the peripheral devices that can be used via the communication range limiting device 1001 that is connected through the wireless LAN communication. The peripheral device list is updated by being received from the communication range limiting device 1001.

The wireless LAN communication unit 1031 communicates with the communication range limiting device 1001 through the wireless LAN when the smartphone 1002 is located within the wireless LAN communication area 1005 illustrated in FIG. 14. The BLE communication unit 1032 receives the advertisement channel that includes the communication range information indicative of the BLE communication area 1006. When the smartphone 1002 is located within the BLE communication area 1006 as found by referring to the received communication range information, the BLE communication unit 1032 communicates with the communication range limiting device 1001 through the BLE communication. Additionally, the BLE communication unit 1032 receives a PIN code for performing the wireless LAN communication from the communication range limiting device 1001.

The display control module 203 controls display of various types of information on a display for the user. For example, the display control module 203 controls display of a print setup screen for making a print setup. The input receiving module 204 receives various inputs from the user. For example, the input receiving module 204 receives through the print setup screen an input of specifying a specific printer device for performing printing and an input of specifying print data to be printed.

The communication control module 205 controls communication with other communication devices performed through the wireless LAN communication unit 1031 and the BLE communication unit 1032. Specifically, for example, the communication control module 205 receives an updated peripheral device list from the communication range limiting device 1001 and transmits a print request from the user together with print data specified therewith to the communication range limiting device 1001.

The control module 206 controls the smartphone 1002. For example, the control module 206 refers to the communication range information received from the communication range limiting device 1001 and determines whether the smartphone 1002 is located within the BLE communication area 1006. When an updated peripheral device list is received, the control module 206 updates the peripheral device list in the storage module 220.

The following describes steps to be performed for registering a smartphone 1002 in the wireless LAN-connected device list when the smartphone 1002 is connected to the communication range limiting device 1001 through the wireless LAN communication. FIG. 18 is a flowchart illustrating steps to be performed for registering a smartphone in the communication range limiting device according to the first embodiment.

The detecting module 104 detects that the smartphone 1002 has entered the BLE communication area 1006 (Step S100).

The connection processing module 106 refers to the wireless LAN-connected device list to thereby determine whether a smartphone that has previously been connected to the wireless LAN communication exists. If it is determined that a previously connected smartphone exists, the connection processing module 106 inquires, via the wireless LAN AP unit 1016, of the previously connected smartphone whether a new smartphone 1002 can be connected (connectability) (Step S102).

The connection processing module 106 determines whether connection permission by the previously connected smartphone is obtained with respect to the inquiry about connectability (Step S104). If the connection permission is not obtained (No at Step S104), the connection processing module 106 notifies the smartphone 1002 of the connection rejection and disconnects the BLE communication (Step S106).

If the connection permission is obtained (Yes at Step S104), the communication control module 105 performs processing, using the BLE communication by the BLE communication unit 1017, for establishing connection through the wireless LAN communication between the communication range limiting device 1001 and the smartphone 1002 (Step S108).

When the smartphone 1002 is connected, the type and the IP address of the connected smartphone 1002 are registered in the wireless LAN-connected device list stored in the storage module 120 (Step S110). It is noted that the steps for inquiring of the previously connected smartphone connectability and obtaining the connection permission for the connection of the new smartphone 1002 (Step S102 to Step S104) may be omitted.

The following describes steps to be performed for registering a peripheral device such as a printer device in the peripheral device list when the peripheral device is connected to the communication range limiting device 1001 over the wired network 91. FIG. 19 is a flowchart illustrating steps to be performed for registering a peripheral device in the communication range limiting device according to the first embodiment.

When the communication range limiting device 1001 is connected through the peripheral device communication unit 1018 to a peripheral device located outside a communication range of the BLE communication (Step S120), the list control module 107 registers the type and the IP address of the connected peripheral device in the peripheral device list stored in the storage module 130 (Step S122).

The communication control module 105 transmits the updated peripheral device list to the smartphone 1002 (Step S124). The smartphone 1002, upon receipt of the updated peripheral device list, causes the control module 206 to update the peripheral device list stored in the storage module 220 with the received peripheral device list.

The following describes steps to be performed by the smartphone 1002 that has connected to the printer device 92 via the communication range limiting device 1001 to print data. FIG. 20 is a flowchart illustrating steps of a print process to be performed in the smartphone according to the first embodiment via the communication range limiting device.

When the input receiving module 204 of the smartphone 1002 receives a print request from the user (Step S130), the display control module 203 refers to the peripheral device list stored in the storage module 220 and displays printer devices that can be used by the smartphone 1002 (Step S132).

The input receiving module 204 thereafter receives an input of specifying a specific printer device (Step S134) from the user and an input of specifying desired print data from the user (Step S136). The communication control module 205 transmits via the wireless LAN communication unit 1031 the printer device specification and the print data together with the print request received from the user to the communication range limiting device 1001 (Step S138) through the wireless LAN communication.

The communication range limiting device 1001 causes the wireless LAN AP unit 1016 to receive the printer device specification and the print data together with the print request from the smartphone 1002. The peripheral device communication unit 1018 of the communication range limiting device 1001 transmits the print data (predetermined information relating to the print request) together with the print request to the specified printer device 92 over the wired network 91. The printer device 92 performs printing of the received print data in accordance with the received print request.

The following describes steps to be performed for disconnecting a smartphone 1002 that has been connected to the communication range limiting device 1001 through the wireless LAN communication. FIG. 21 is a flowchart illustrating steps to be performed for disconnecting the smartphone in the communication range limiting device according to the first embodiment.

The communication control module 105 receives through the wireless LAN communication information that the smartphone 1002 has moved out of the BLE communication area 1006 (Step S150). The connection processing module 106 disconnects the wireless LAN communication with the smartphone 1002 that has moved out of the BLE communication area 1006 (Step S152). The list control module 107 deletes the smartphone 1002 that has moved out of the BLE communication area 1006 from the wireless LAN-connected device list stored in the storage module 120 (Step S154).

In summary, the communication range limiting device 1001 according to the first embodiment builds an ad hoc network by transmitting through the short-range communication such as the BLE communication to the smartphone 1002 the PIN code (setup information) required for connection through the wireless LAN communication and, using the setup information, processing to establish connection with the smartphone 1002 through the wireless LAN communication. The communication range limiting device 1001 is connected to the printer device 92 that is disposed outside the BLE communication area 1006 over, for example, the wired network 91. This arrangement enables the smartphone 1002 to perform printing using the printer device 92 disposed outside the communication range of the short-range communication such as the BLE communication via the communication range limiting device 1001 that is connected through the wireless LAN communication and that has the access point function by transmitting a print request to the communication range limiting device 1001. Specifically, in the ad hoc network that uses the wireless LAN communication, use is enabled of the printer device 92 that is disposed outside the BLE communication area 1006 of the BLE communication that is used when the setup information required for connection is acquired.

Second Embodiment

The communication range limiting device according to the first embodiment enables communication in a single ad hoc network between a smartphone connected through the wireless LAN communication and a printer device as a peripheral device disposed outside the BLE communication area. In contrast, the present embodiment includes a plurality of ad hoc networks such as the ad hoc network of the first embodiment. The following describes a configuration that includes two ad hoc networks. Understandably, the embodiment can be applied to a configuration including three or more ad hoc networks.

FIG. 22 is a general configuration diagram of a communication system according to a second embodiment. Reference is made to FIG. 22. In the present embodiment, in the communication system including a communication range limiting device 1001 and a smartphone 1002, an ad hoc network is present within a wireless LAN communication area 1005. The ad hoc network includes the communication range limiting device 1001, the smartphone 1002, a projector device 1004, and a projector device 1004', as in the first embodiment. In addition, the second embodiment further includes another ad hoc network within a wireless LAN communication area 2005 in a communication system that includes a communication range limiting device 2001 and a smartphone 2002. The other ad hoc network includes the communication range limiting device 2001, the smartphone 2002, a projector device 2004, and a projector device 2004'. Specifically, the second embodiment includes a plurality of communication environments (ad hoc networks), each being built by a wireless LAN communication area including a BLE communication area.

In the present embodiment, like elements are identified by like reference numerals as in the first embodiment and descriptions therefor will be omitted for their similarity in function and configuration. Additionally, a wireless LAN AP unit 2016 is identical to the wireless LAN AP unit 1016 and a BLE communication unit 2017 is identical to the BLE communication unit 1017. Similarly, a wireless LAN communication unit 2031 is identical to the wireless LAN communication unit 1031, a BLE communication unit 2032 is identical to the BLE communication unit 1032, a wireless LAN communication unit 2067 is identical to the wireless LAN communication unit 1067, a BLE communication unit 2068 is identical to the BLE communication unit 1068, a wireless LAN communication unit 2067' is identical to the wireless LAN communication unit 1067', and a BLE communication unit 2068' is identical to the BLE communication unit 1068.

A printer device 94 exists outside the communication range of the BLE communication in at least one ad hoc network (communication environment). In the present embodiment, the printer device 94 is disposed outside the wireless LAN communication areas 1005 and 2005 and is connected to, and thus can communicate with, the communication range limiting device 1001 and the communication range limiting device 2001 over a wired network 93.

In the ad hoc networks (communication environments; there are two in the present embodiment), at least one communication range limiting device controls communication with the smartphone and the printer device 94. In the present embodiment, the communication range limiting device 1001 controls communication with the smartphone 1002 and the printer device 94 and the communication range limiting device 2001 controls communication with the smartphone 2002 and the printer device 94.

Specifically, the communication range limiting devices 1001 and 2001 illustrated in FIG. 22 each have an independent network through the wireless LAN communication and the BLE communication. Each of these networks is a unique data link different from each other. Each of the data links, if it is an IPv4 network, has a unique network address. Each of the data links, if it is an IPv6 network, has a unique prefix.

The communication range limiting devices 1001 and 2001 each have a router function and each are connected to the wired network 93 that has one subnet prefix. Packets can reach the wired network 93 from both of the two ad hoc networks built by the wireless LAN communication areas 1005 and 2005. A peripheral device that can be used from both of the ad hoc networks is installed. The peripheral device is the printer device 94 in the current example.

In summary, the communication range limiting devices 1001 and 2001 according to the second embodiment transmit through the short-range communication such as the BLE communication to the smartphones 1002 and 2002 setup information that is required for the connection through the wireless LAN communication and, using the setup information, process to establish connection with the smartphones 1002 and 2002 through the wireless LAN communication, thereby building the ad hoc networks. The communication range limiting devices 1001 and 2001 are connected to the printer device 94 that is disposed outside the BLE communication area 1006 over, for example, the wired network 93. This arrangement enables the smartphones 1002 and 2002 to perform printing using the printer device 94 disposed outside the communication range of the short-range communication such as the BLE communication via the communication range limiting devices 1001 and 2001 that are connected through the wireless LAN communication and that has the access point function by transmitting a print request to the communication range limiting devices 1001 and 2001. Specifically, even when a plurality of ad hoc networks that use the wireless LAN communication are involved, use is enabled of the printer device 94 that is disposed outside the BLE communication areas 1006 and 2006 of the BLE communication that are used when the setup information required for connection is acquired.

Third Embodiment

The communication range limiting device according to the first embodiment enables communication in a single ad hoc network between a smartphone connected through the wireless LAN communication and a printer device as a peripheral device disposed outside the BLE communication area. The communication range limiting device according to the second embodiment is applicable to a configuration that includes the ad hoc network in the first embodiment in plurality. In contrast, the present embodiment uses, in an ad hoc network such as the ad hoc network of the first and second embodiments, a portable storage medium (e.g., a BLE communication tag that internally retains electronic information) to register information on a printer device disposed outside the communication range of the BLE communication. The following describes the use of the BLE communication tag in a plurality of ad hoc networks of the second embodiment. Understandably, the embodiment can be applied to a configuration including a single ad hoc network.

FIG. 23 is a general configuration diagram of a communication system according to a third embodiment. Reference is made to FIG. 23. As in the second embodiment, two ad hoc networks (communication environments built by communication ranges of the wireless LAN communication including communication ranges of the BLE communication) exist in the present embodiment. When a BLE communication tag 600 enters a BLE communication area 1006, a communication range limiting device 1001*a* reads the information on the printer device stored in the BLE communication tag 600 and stores the printer device information in the peripheral device list.

FIG. 24 is a diagram illustrating an appearance of an exemplary BLE communication tag. FIG. 25 is a diagram illustrating a configuration of the BLE communication tag. As illustrated in FIG. 24, the BLE communication tag 600 has a portable configuration and is capable of BLE communication.

As illustrated in FIG. 25, the BLE communication tag 600 includes a BLE communication module 602 and a peripheral device information notifying module 604.

The BLE communication module 602 communicates with a BLE communication unit 102 when the BLE communication tag 600 enters the BLE communication area 1006.

The peripheral device information notifying module 604 notifies the communication range limiting device 1001a via the BLE communication module 602 of internally stored peripheral device information and that includes, for example, the type of a printer device 94 and the IP address as identification information.

FIG. 26 is a diagram illustrating a functional configuration of the communication range limiting device according to the third embodiment. As illustrated in FIG. 26, the communication range limiting device 1001a chiefly includes storage modules 120 and 130, a wireless LAN AP unit 1016, a BLE communication unit 1017, a peripheral device communication unit 1018, a detecting module 104a, a communication control module 105, a connection processing module 106, a list control module 107a, and a reading module 108a. Functions and configurations of the storage modules 120 and 130, the wireless LAN AP unit 1016, the BLE communication unit 1017, the peripheral device communication unit 1018, the communication control module 105, and the connection processing module 106 are the same as those described with reference to the first embodiment and descriptions therefor will be omitted.

The detecting module 104a detects that another communication device such as a smartphone 1002 or the BLE communication tag 600 has entered the BLE communication area 1006. The applicable detection method is the same as that in the first embodiment.

If the detecting module 104a has detected that the BLE communication tag 600 entered the BLE communication area 1006, the reading module 108a reads the peripheral device information that includes the type and the IP address of the printer device 94 reported by the BLE communication tag 600.

The list control module 107a stores the peripheral device information (the type and the IP address of the printer device) read by the reading module 108a in the peripheral device list stored in the storage module 130, in addition to performing the functions described with reference to the first embodiment.

The following describes steps to be performed for registering the information on the printer device 94 in the peripheral device list when the BLE communication tag 600 enters the BLE communication area 1006. FIG. 27 is a flowchart illustrating steps to be performed for registering a printer device in the communication range limiting device according to the third embodiment.

When the detecting module 104a detects that the BLE communication tag 600 has entered the BLE communication area 1006 (Step S160), the reading module 108a reads the peripheral device information including the type and the IP address of the printer device 94 from the BLE communication tag 600 (Step S162).

The list control module 107a stores the type, the IP address, and the like of the printer device read by the reading module 108a in the peripheral device list (Step S164). The communication control module 105 f the updated peripheral device list, causes the control module 206 to update the peripheral device list stored in the storage module 220 with the received peripheral device list.

In summary, the communication range limiting device 1001a according to the present embodiment transmits, from the smartphone 1002 through the short-range communication such as the BLE communication, setup information that is required for the connection through the wireless LAN communication, and using the setup information, performs connection processing through the wireless LAN communication with the smartphone 1002, so as to build the ad hoc network. The communication range limiting device 1001a is connected to the printer device 94 that is disposed outside the BLE communication area 1006 over a wired network 93. This arrangement enables the smartphone 1002 to perform printing using the printer device 94 disposed outside the communication range of the short-range communication such as the BLE communication via the communication range limiting device 1001a that is connected through the wireless LAN communication and that has the access point function by transmitting a print request to the communication range limiting device 1001a. Specifically, in the ad hoc network that uses the wireless LAN communication, use is enabled of the printer device 94 that is disposed outside the BLE communication area 1006 of the BLE communication that is used when the setup information required for connection is acquired.

In addition, a simple entry in the BLE communication area 1006 or 2006 with the BLE communication tag 600 that stores peripheral device information allows the type and the IP address of the peripheral device that can be used to be registered in the peripheral device list, making the peripheral device in question available for use. Consider, for example, that the BLE communication areas 1006 and 2006 are each a single conference room. Upon entry in the conference room, a BLE communication tag 600 that is prepared in advance and in which a peripheral device such as a printer device shared among the conference rooms is registered is received at a registration of the conference room. This procedure enables the peripheral device such as the shared printer device to be used in the conference room.

REFERENCE SIGNS LIST 1, 1001, 1001a, 2001 Communication range limiting device
2, 1002, 2002 Smartphone
3, 92, 94 Printer device
4, 1004, 1004', 2004, 2004' Projector device
5, 1005, 2005 Wireless LAN communication area
6, 1006, 2006 BLE communication area
15 Input/output I/F
16, 1016, 2016 Wireless LAN AP unit
17, 1017, 2017 BLE communication unit
31, 1031, 2031 Wireless LAN communication unit
32, 1032, 2032 BLE communication unit
47 Wireless LAN communication unit
48 BLE communication unit
67 Wireless LAN communication unit
68 BLE communication unit
75 Device connecting module
76 Peripheral device connecting module
77 Withdrawal detecting module
78 Wireless LAN AP control module
79 BLE communication control module
81 Print request module
82 Wireless LAN communication control module
83 BLE communication control module
85 Print module
86 Wireless LAN communication control module
87 BLE communication control module
91, 93 Wired network
104, 104a Detecting module
105 Communication control module
106 Connection processing module
107, 107a List control module
108a Reading module
120, 130, 220 Storage module 203 Display control module
204 Input receiving module
205 Communication control module
206 Control module
600 BLE communication tag
602 BLE communication module
604 Peripheral device information notifying module

CITATION LIST

Patent Literature

PTL 1: Japanese Patent No. 5524583

The invention claimed is:

1. A communication device comprising:
   processing circuitry;
   a first communication interface that performs communication with a second communication device using a first communication scheme that enables communication in a first range; and
   a second communication interface being configured to perform, when the processing circuitry determines that the second communication device received transmitted certain information, communication with the second communication device in a second range that is different from the first range and in which the second communication device is capable of receiving the certain information,
   the processing circuitry being configured to relay communication from the second communication device to a third device disposed on a network that is accessible to the communication device but is non-accessible to the second communication device,
   wherein processing circuitry is configured to disconnect the second communication device from communicating with the communication device via the first communication interface and the second communication interface when the communication device detects that the second communication device has moved out of the second range.

2. The communication device according to claim 1, further comprising:
   a third communication interface that performs communication with the third device, wherein
   the second communication interface transmits, to the second communication device, setup information for establishing communication with the first communication interface, wherein
   the first communication interface performs communication using the first communication scheme with the second communication device that has received the setup information, and
   when the first communication interface receives, from the second communication device, a connection request with respect to the second device, the third communication interface transmits, to the third device, information relating to the connection request together with the connection request.

3. The communication device according to claim 1, further comprising:
   a memory that stores therein peripheral device information in which a type of the third device that is capable of being communicated through the third communication interface is associated with identification information of the third device; and
   processing circuitry that, when the third communication interface establishes connection with the third device, stores the type and the identification information of the connected third device in the peripheral device information.

4. The communication device according to claim 1, further comprising:
   a memory that stores therein peripheral device information in which a type of the third device that is capable of being communicated through the third communication interface is associated with identification information of the third device;
   processing circuitry that
   detects that a storage medium enters the second range, the storage medium storing therein the type and the identification information of the third device;
   reads the type and the identification information of the third device from the storage medium when entry of the storage medium in the second range is detected; and
   stores the read type and identification information of the third device in the peripheral device information.

5. The communication device according to claim 1, wherein
   when a plurality of communication environments built in the first range including the second range exist, the third device is disposed outside the second range in at least one of the communication environments, and
   at least one communication device controls communication between the second communication device and the third device in the communication environments.

6. The communication device according to claim 1, wherein the second communication scheme utilizes Bluetooth (registered trademark) technology.

7. The communication device according to claim 1, wherein the second communication interface transmits, to the second communication device, setup information for establishing communication with the first communication interface when the communication device detects that the second communication device has entered an area corresponding to the second range.

8. A system comprising:
   a first communication device including
   a first communication interface that performs communication with a second communication device in a first range, and
   a second communication interface that performs communication with the second communication device in a second range that is different from the first range; and
   a second communication device including:
   a second communication interface that receives certain information in the second range; and
   a first communication interface that performs communication with the first communication interface of the first communication device when the second communication interface receives the certain information, wherein
   the second communication device performs communication with a third device disposed on a network that is accessible to the communication device but is non-accessible to the second communication device via the first communication device,
   wherein the first communication device disconnects the second communication device from communicating with the communication device via the first communication interface and the second communication interface when the first communication device detects that the second communication device has moved out of the second range.

9. A computer program product comprising a non-transitory computer-readable medium containing an information processing program, the program causing a communication device including:
- a first communication interface that performs communication using a first communication scheme that enables communication in a first range;
- a second communication interface that performs communication using a second communication scheme that enables communication in a second range; and
- a third communication interface that performs communication with a third device disposed on a network that is accessible to the communication device but is non-accessible to a second communication device, to perform:
- transmitting, by the second communication interface, setup information for establishing communication by the first communication interface to the second communication device that is capable of communication through the first communication scheme and the second communication scheme;
- performing communication, by the first communication interface, using the first communication scheme with the second communication device that has received the setup information; and
- when the first communication interface receives a connection request to the third device from the second communication device, transmitting, by the third communication interface, information relating to the connection request together with the connection request to the third device,
- wherein the communication device disconnects the second communication device from communicating with the communication device via the first communication interface and the second communication interface when the communication device detects that the second communication device has moved out of the second range.

10. A communication device comprising:
- a first communication interface that performs communication with a second communication device; and
- a second communication interface that receives certain information,
- the first communication interface performing, when the second communication interface has received the certain information, communication with the second communication device in a second range that is different from a first range in which communication with the second communication device is possible and in which the second communication interface is capable of receiving the certain information,
- the communication device performing communication with a third device, disposed on a network that is accessible to the second communication device but is non-accessible to the communication device, via the second communication device,
- wherein the communication device is disconnected from communicating with the second communication device via the first communication interface and the second communication interface when the second communication device detects that the communication device has moved out of the second range.

* * * * *